US007668160B2

(12) United States Patent
Narayan et al.

(10) Patent No.: US 7,668,160 B2
(45) Date of Patent: Feb. 23, 2010

(54) METHODS FOR PERFORMING PACKET CLASSIFICATION

(75) Inventors: Harsha L. Narayan, Santa Clara, CA (US); Alok Kumar, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 743 days.

(21) Appl. No.: 11/097,628

(22) Filed: Mar. 31, 2005

(65) Prior Publication Data

US 2006/0221954 A1    Oct. 5, 2006

(51) Int. Cl.
*H04L 12/28* (2006.01)

(52) U.S. Cl. .............. 370/389; 370/395.32; 370/395.42

(58) Field of Classification Search .............. 370/389, 370/390, 392, 394, 229, 230, 235, 252, 254, 370/395.31, 395.32, 395.42
See application file for complete search history.

(56) References Cited

U.S. PATENT DOCUMENTS

| | | | | | |
|---|---|---|---|---|---|
| 5,951,651 | A | * | 9/1999 | Lakshman et al. | 709/239 |
| 6,266,706 | B1 | * | 7/2001 | Brodnik et al. | 709/242 |
| 6,289,013 | B1 | | 9/2001 | Lakshman | |
| 6,600,744 | B1 | | 7/2003 | Carr et al. | |
| 6,970,462 | B1 | * | 11/2005 | McRae | 370/392 |
| 7,054,315 | B2 | * | 5/2006 | Liao | 370/392 |
| 7,136,926 | B1 | * | 11/2006 | Iyer et al. | 709/229 |
| 7,236,493 | B1 | * | 6/2007 | McRae | 370/392 |
| 7,325,074 | B2 | * | 1/2008 | McRae | 709/242 |
| 2002/0089937 | A1 | * | 7/2002 | Venkatachary et al. | 370/255 |
| 2002/0191605 | A1 | * | 12/2002 | Lunteren et al. | 370/389 |
| 2003/0108043 | A1 | * | 6/2003 | Liao | 370/392 |
| 2004/0170170 | A1 | * | 9/2004 | Joung et al. | 370/389 |
| 2005/0262127 | A1 | * | 11/2005 | Mishra et al. | 707/102 |
| 2006/0164980 | A1 | * | 7/2006 | Guru | 370/229 |

OTHER PUBLICATIONS

Baboescu et al., "Aggregated Bit Vector Search Algorithms for Packet Filter Lookups", Dept. of Computer Science and Engineering, pp. 1-26.

(Continued)

*Primary Examiner*—Steven H Nguyen
*Assistant Examiner*—Anh Ngoc Nguyen
(74) *Attorney, Agent, or Firm*—Blakely, Sokoloff, Taylor & Zafman LLP

(57) ABSTRACT

Methods for performing packet classification. In one embodiment, packets are classified using a rule bit vector optimization scheme, wherein original rule bit vectors in recursive flow classification (RFC) chunks are optimized by removing useless bits that have no effect on the ultimate rule identified by an associated RFC lookup process. The unique optimized rule bit vectors for associated chunks are then cross-producted to produce an optimized downstream chunk. In another embodiment, a rule database splitting scheme is employed. Under this technique, split criteria is defined to split a rule database, such as splitting based on a particular field value or range. A respective set of downstream chunks is then generated for each partition, beginning with the chunks in a split phase. The applicable rule bit vectors for the chunks associated with a common group and partition are identified, and then unique applicable rule bit vectors for those chunks are cross-producted to produce downstream chunks.

18 Claims, 15 Drawing Sheets

OTHER PUBLICATIONS

Gupta et al., "Packet Classification using Hierarchical Intelligent Cuttings", Computer Systems Laboratory, Stanford University.

Singh et al., "Packet Classification Using Multidimensional Cutting", SIGCOMM'03, Aug. 25-29, 2003, Karlsruhe, Germany, pp. 213-224.

"42P21553 OA Mailed Mar. 4, 2008 for U.S. Appl. No. 11/096,960", Whole Document.

Non-Final Office Action for U.S. Appl. No. 11/170,230 mailed Feb. 10, 2009; 21 pages.

Haoyu Song and John W. Lockwood, "Efficient Packet Classification for Network Intrusion Detection using FPGA", Feb. 20, 2005, FPGA '05, ACM, (Feb. 20, 2005), Whole Document.

Spitznagel, Edward W., "Compressed Data Structures for Recursive Flow Classification", May 16, 2003, Washington University in St. Louis, (May 16, 2003), Whole Document.

USPTO, "Final Office Action for U.S. Appl. No. 11/170,230 dated Sep. 1, 2009.", (Sep. 1, 2009), Whole Document.

USPTO, "Office Action for U.S. Appl. No. 11/170,230 mailed Feb. 10, 2009", (Feb. 10, 2009), Whole Document.

\* cited by examiner

|  | Source Prefix | Destination Prefix | Source Port | Dest Port | Protocol |
|---|---|---|---|---|---|
| Rule 1: | 202.141.80.0/24 | 100.100.100.32/28 | * | 1521 | TCP |
| Rule 2: | 202.141.0.0/16 | 100.100.100.32/28 | * | 1521 | TCP |
| Rule 3: | * | 100.100.100.32/28 | * | 80 | TCP |

*Fig. 1a* 100

Source prefixes:
| Prefix value | Rule Bitvector |
|---|---|
| 202.141.80.0/24 | 111 |
| 202.141.0.0/16 | 011 |
| * | 001 |

Destination prefixes:
| Prefix value | Rule Bitvector |
|---|---|
| 100.100.100.32/28 | 111 |

Source ports:
| Port range | Rule Bitvector |
|---|---|
| * | 111 |

Destination ports:
| Port range | Rule Bitvector |
|---|---|
| 1521 | 110 |
| 80 | 001 |

Protocol:
| Protocol value | Rule Bitvector |
|---|---|
| tcp | 111 |

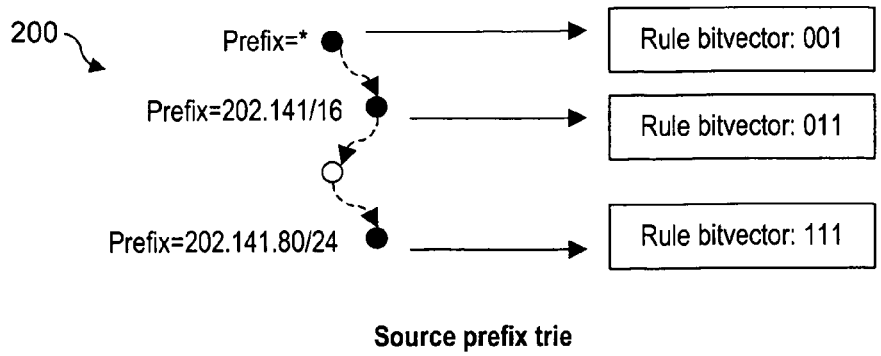
*Fig. 2a*
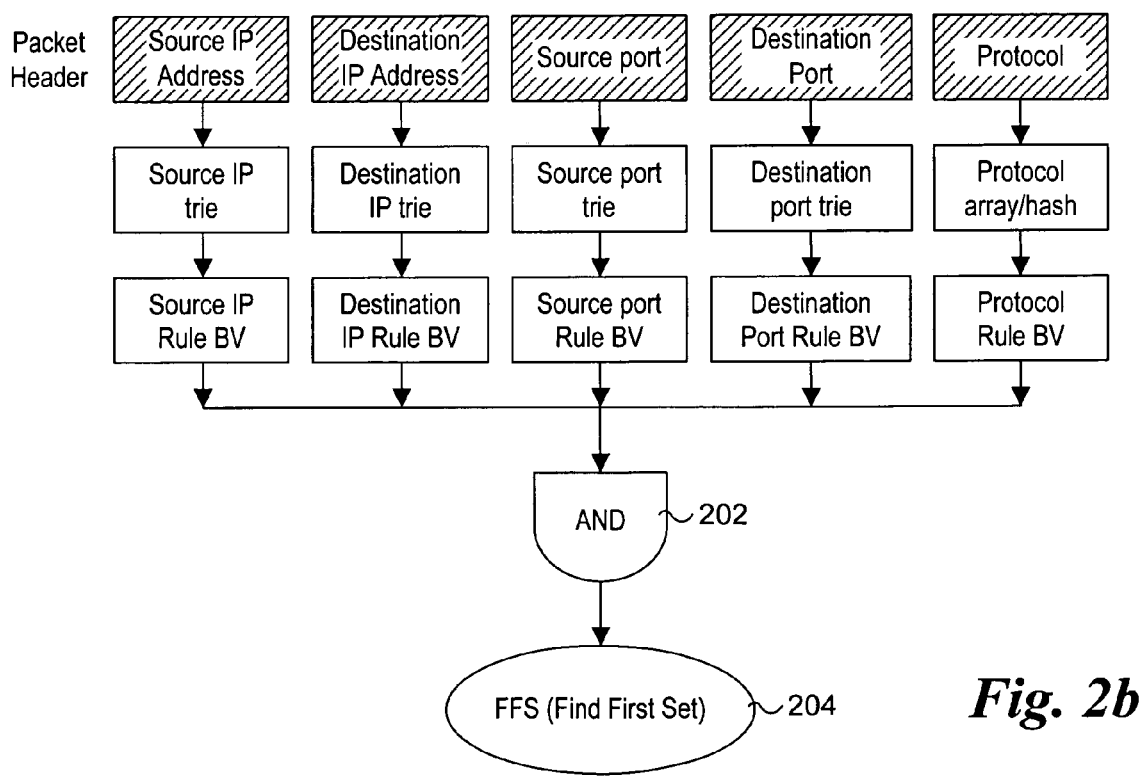
*Fig. 2b*
*Fig. 2c*

RFC lookup process

Breakup of RFC Memory Consumption

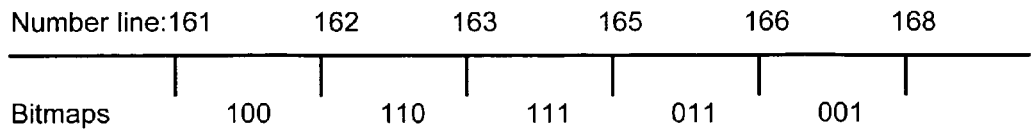
*Fig. 4a*
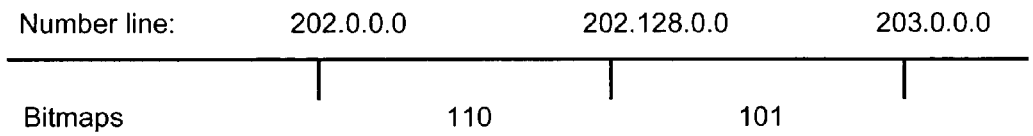
*Fig. 4b*
| 3. The old chunk IDs are mapped to new chunk IDs. |
|---|
| X_ID_0  New_X_ID_0 | Y_ID_0  New_Y_ID_0 |
| X_ID_1  New_X_ID_1 | *Y_ID_1  New_Y_ID_0* |
| X_ID_2  New_X_ID_2 | Y_ID_2  New_Y_ID_2 |
| *X_ID_3  New_X_ID_0* | |
*Fig. 5c*

Chunk X and Chunk Y before rule bit optimization

| X_ID_0 | Y_ID_0 |
|---|---|
| X_ID_0 | Y_ID_1 |
| X_ID_1 | Y_ID_1 |
| X_ID_3 | Y_ID_0 |
| X_ID_3 | Y_ID_0 |
| X_ID_3 | Y_ID_2 |
| X_ID_3 | Y_ID_2 |
| X_ID_1 | Y_ID_0 |
| X_ID_1 | Y_ID_1 |
| X_ID_2 | Y_ID_1 |
| X_ID_2 | Y_ID_2 |
| X_ID_3 | |
| X_ID_3 | |
| X_ID_0 | |
| X_ID_0 | |

*Fig. 6a*

Chunk X and Chunk Y after the rule bit optimization
*(Note that the number of entries remains the same)*

| New_X_ID_0 | New_Y_ID_0 |
|---|---|
| New_X_ID_0 | New_Y_ID_0 |
| New_X_ID_1 | New_Y_ID_0 |
| New_X_ID_0 | New_Y_ID_0 |
| New_X_ID_0 | New_Y_ID_0 |
| New_X_ID_0 | New_Y_ID_2 |
| New_X_ID_0 | New_Y_ID_2 |
| New_X_ID_1 | New_Y_ID_0 |
| New_X_ID_1 | New_Y_ID_0 |
| New_X_ID_2 | New_Y_ID_0 |
| New_X_ID_2 | New_Y_ID_2 |
| New_X_ID_0 | |
| New_X_ID_0 | |
| New_X_ID_0 | |
| New_X_ID_0 | |

*Fig. 6b*

METHODS FOR PERFORMING PACKET CLASSIFICATION

FIELD OF THE INVENTION

The field of invention relates generally to computer and telecommunications networks and, more specifically but not exclusively relates to techniques for performing packet classification at line rate speeds.

BACKGROUND INFORMATION

Network devices, such as switches and routers, are designed to forward network traffic, in the form of packets, at high line rates. One of the most important considerations for handling network traffic is packet throughput. To accomplish this, special-purpose processors known as network processors have been developed to efficiently process very large numbers of packets per second. In order to process a packet, the network processor (and/or network equipment employing the network processor) needs to extract data from the packet header indicating the destination of the packet, class of service, etc., store the payload data in memory, perform packet classification and queuing operations, determine the next hop for the packet, select an appropriate network port via which to forward the packet, etc. These operations are generally referred to as "packet processing" operations.

Traditional routers, which are commonly referred to as Layer 3 Switches, perform two major tasks in forwarding a packet: looking up the packet's destination address in the route database (also referred to a the a route or forwarding table), and switching the packet from an incoming link to one of the routers outgoing links. With recent advances in lookup algorithm and improved network processors, it appears that layer 3 switches should be able to keep up with increasing line rate speeds, such as OC-192 or higher.

Increasingly, however, users are demanding, and some vendors are providing a more discriminating form of router forwarding. This new vision of forwarding is called Layer 4 Forwarding because routing decisions can be based on headers available at Layer 4 or higher in the OSI architecture. Layer 4 forwarding is performed by packet classification routers (also referred to as Layer 4 Switches), which support "service differentiation." This enables the router to provide enhanced functionality, such as blocking traffic from a malicious site, reserving bandwidth for traffic between company sites, and provide preferential treatment to one kind of traffic (e.g., online database transactions) over other kinds of traffic (e.g., Web browsing). In contrast, traditional routers do not provide service differentiation because they treat all traffic going to a particular address in the same way.

In packet classification routers, the route and resources allocated to a packet are determined by the destination address as well as other header fields of the packet such as the source address and TCP/UDP port numbers. Layer 4 switching unifies the forwarding functions required by firewalls, resource reservations, QoS routing, unicast routing, and multicast routing into a single unified framework. In this framework, forwarding database of a router consists of a potentially large number of filters on key header fields. A given packet header can match multiple filters; accordingly, each filter is given a cost, and the packet is forwarded using the least cost matching filter.

Traditionally, the rules for classifying a message are called filters (or rules in firewall terminology), and the packet classification problem is to determine the lowest cost matching filter or rule for each incoming message at the router. The relevant information is contained in K distinct header fields in each message (packet). For instance, the relevant fields for an IPv4 packet could comprise the Destination Address (32 bits), the Source Address (32 bits), the Protocol Field (8 bits), the Destination Port (16 bits), the Source Port (16 bits), and, optionally, the TCP flags (8 bits). Since the number of flags is limited, the protocol and flags may be combined into one field in some implementations.

The filter database of a Layer 4 Switch consists of a finite set of filters, $filt_1, filt_2 \ldots filt_N$. Each filter is a combination of K values, one for each header field. Each field in a filter is allowed three kinds of matches: exact match, prefix match, or range match. In an exact match, the header field of the packet should exactly match the filter field. In a prefix match, the filter field should be a prefix of the header field. In a range match, the header values should like in the range specified by the filter. Each filter $filt_i$ has an associated directive $disp_i$, which specifies how to forward a packet matching the filter.

Since header processing for a packet may match multiple filters in the database, a cost is associated with each filter to determine the appropriate (best) filter to use in such cases. Accordingly, each filter F is associated with a cost(F), and the goal is to find the filter with the least cost matching the packet's header.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 1a shows an exemplary set of packet classification rules comprise a rule database;

FIGS. 1b-f show various rule bit vectors derived from the rule database of FIG. 1a, wherein FIG. 1b, 1c, 1d, 1e, and 1f respectively show rule bit vectors corresponding to source address prefixes, destination address prefixes, source port values, destination port values, and protocol values;

FIG. 2a depicts rule bit vectors corresponding to an exemplary trie structure;

FIG. 2b shows parallel processing of various. packet header field data to identify an applicable rule for forwarding a packet;

FIG. 2c shows a table containing an exemplary set of packet header values and corresponding matching bit vectors corresponding to the rules defined the rule database of FIG. 1a;

FIGS. 4a and 4b are schematic diagram depicting various bitmap to header field range mappings;

FIG. 5c is a diagram illustrating the mapping of previous rule bit vector identifiers (IDs) to new IDs;

FIG. 6*a* illustrates a set of exemplary chunks prior to applying rule bit optimization, while FIG. 6*b* illustrates modified ID values in the chunks after applying rule bit vector optimization;

DETAILED DESCRIPTION

Figure 3A:
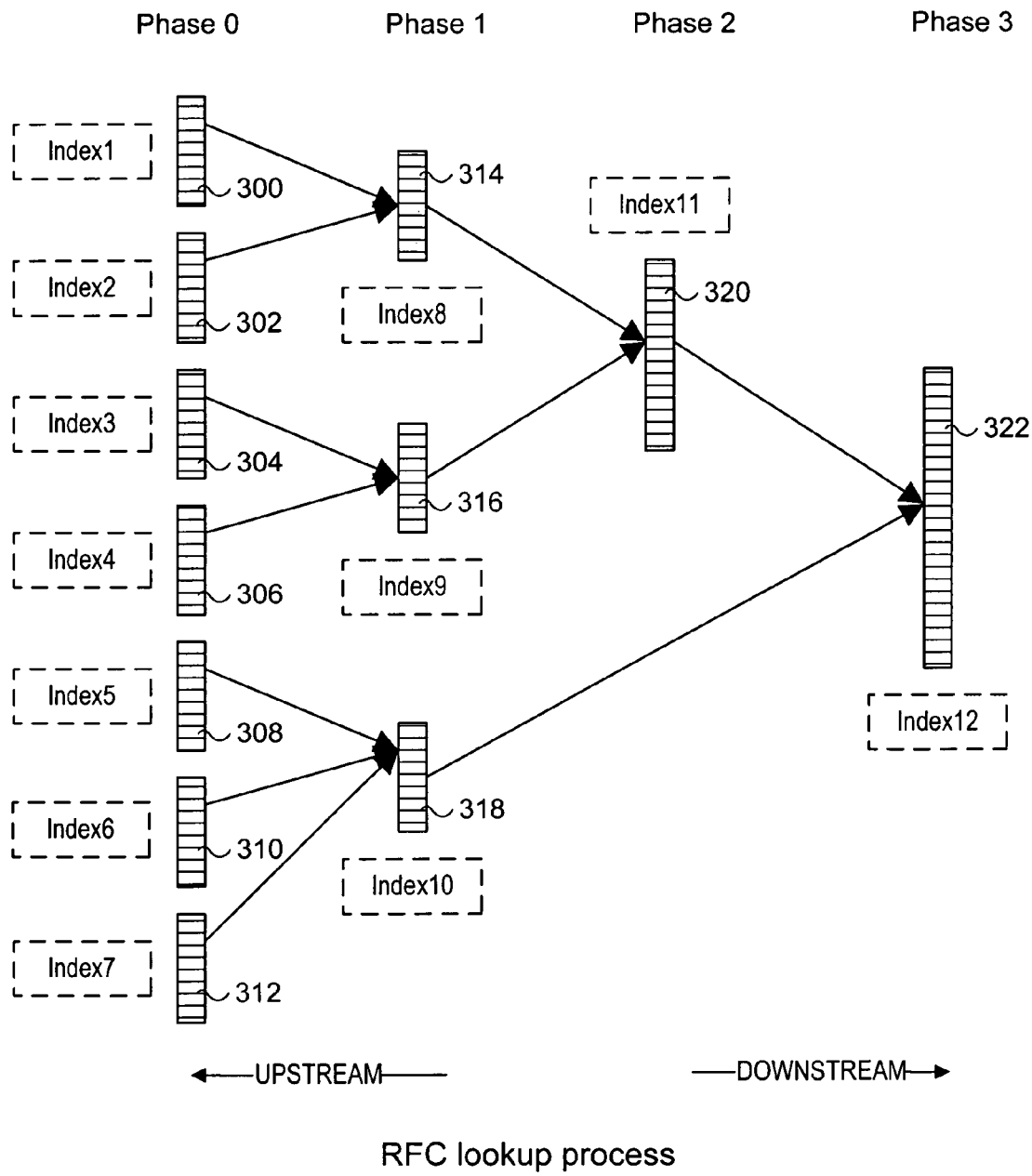
FIG. 3a is a schematic diagram of a conventional recursive flow classification (RFC) lookup process and an exemplary RFC reduction tree configuration.

Embodiments of methods and apparatus for performing packet classification are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. In addition, the following specific terminology is used herein:

ACL: Access Control List (The set of rules that are used for classification).

ACL size: Number of rules in the ACL.

Bitmap: same as bit vector.

Cover: A range p is said to cover a range q, if q is a subset of p. e.g., p=202/7, q=203/8. Or p=* and q=gt 1023.

Database: Same as ACL.

Database size: Same as ACL size.

Prefix pair: The pair (source prefix, destination prefix).

Dependent memory access: If some number of memory accesses can be performed in parallel, i.e. issued at the same time, they are said to constitute one dependent memory access.

More specific prefix: A prefix q is said to be more specific than a prefix p, if q is a subset of p.

Rule bit vector: a single dimension array of bits, with each bit mapped to a respective rule.

Transport level fields: Source port, Destination port, Protocol.

Bit Vector (BV) Algorithm

The bit vector (BV) algorithm was introduced by Lakshman and Stiliadis in 1998 (T. V. Lakshman and D. Stiliadis, *High Speed Policy-Based Forwarding using Efficient Multidimensional Range Matching*, ACM SIGCOMM 1998). Under the bit vector algorithm, a bit map (referred to as a bit vector or bitvector) is associated with each dimension (e.g., header field), wherein the bit vector identifies which rule or filters are applicable to that dimension, with each bit position in the bit vector being mapped to a corresponding rule or filter. For example, FIG. 1*a* shows a table 100 including set of three rules applicable to a five-dimension implementation based on five packet header fields: Source (IP address) Prefix, Destination (IP address) Prefix, Source Port, Destination Port, and Protocol. For each dimension, a list of unique values (applicable to the classifier) will be stored in a lookup data structure, along with a rule bit vector for that value. For Source and Destination Prefixes, the values will generally correspond to an address range; accordingly, the terms range and values are used interchangeably herein. Respective data structures 102, 104, 106, 108, and 110 for the Source Prefix, Destination Prefix, Source Port, Destination Port, and Protocol field dimensions corresponding to the entries shown table 100 are shown in FIG. 1*b-f*.

The rule bit vector is configured such that each bit position i maps to a corresponding $i^{th}$ rule. Under the rule bit vector examples shown in FIGS. 1*b-f*, the left bit (bit 1) position applies to Rule 1, the middle bit (bit 2) position applies to Rule 2, and the right bit (bit 3) position applies to Rule 3. If a rule covers a given range or value, it is applicable to that range or value. For example, the Source Prefix value for Rule 3 is *, indicating a wildcard character representing all values. Thus bit 3, is set for all of the Source Prefix entries in data structure 102, since all of the entries are covered by the * value. Similarly, bit 2 is set for each of the first and second entries, since the Source prefix for the second entry (202.141.0.0/16) covers the first entry (202.141.80.0/24) (the /N value represents the number of bits in the prefix, while the "0" values represent a wildcard sub-mask in this example). Meanwhile, since the first Source Prefix entry does not cover the second Source Prefix, bit 1 (associated with Rule 1) is only set for the first Source Prefix value in data structure 102.

As discussed above, only the unique values for each dimension need to be stored in a corresponding data structure. Thus, each of Destination Prefix data structure 104, Source Port data structure 106, and Protocol data structure 110 include a single entry, since all the values in table 1 corresponding to their respective dimensions are the same (e.g., all Destination Prefix values are 100.100.100.32/28). Since there are two unique values (1521 and 80) for the Destination Port dimension, Destination Port data structure 108 includes two entries.

To speed up the lookup process, the unique values for each dimension are stored in a corresponding trie. For example, an exemplary Source Prefix trie 200 corresponding to Source Prefix data structure 102 is schematically depicted in FIG. 2*a*. Similar tries are used for the other dimensions. Each trie includes a node for each entry in the corresponding dimension data structure. A rule bit vector is mapped to each trie node. Thus, under Source Prefix trie 200, the rule bit vector for a node 202 corresponding to a Source Prefix value of 202.141.80/24 has a value of {111}.

Under the Bit Vector algorithm, the applicable bit vectors for the packet header values for each dimension are searched for in parallel. This is schematically depicted in FIG. 2*b*. During this process, the applicable trie for each dimension is traversed until the appropriate node in the trie is found, depending on the search criteria used. The rule bit vector for the node is then retrieved. The bit vectors are then combined by ANDing the bits of the applicable bit vector for each search dimension, as depicted by an AND block 202 in FIG. 2*b*. The highest-priority matching rule is then identified by the leftmost bit that is set. This operation is referred to herein as the Find First Set (FFS) operation, and is depicted by an FFS block 204 in FIG. 2*b*.

A table 206 containing an exemplary set of packet header values and corresponding matching bit vectors corresponding to the rules defined in table 100 is shown in FIG. 2*c*. As discussed above, the matching rule bit vectors are ANDed to produce the applicable bit vector, which in this instance is {110}. The first matching rule is then located in the bit vector by FFS block 204. Since the bit 1 is set, the rule to be applied to the packet is Rule 1, which is the highest-priority matching rule.

The example shown in FIG. 1*a-f* is a very simple example that only includes three rules. Real-world examples include a much greater number of rules. For example, ACL3 has approximately 2200 rules. Thus, for a linear lookup scheme, memory having a width of 2200 bits (1 bit for each rule in the rule bit vector) would need to be employed. Under current memory architectures, such memory widths are unavailable. While it is conceivable that memories having a width of this order could be made, such memories would not address the scalability issues presented by current and future packet classification implementations. For example, future ACL's may include 10's of thousands of rules. Furthermore, since the heart of the BV algorithm relies on linear searching, it cannot scale to both very large databases and very high speeds.

Recursive Flow Classification (RFC)

Recursive Flow Classification (RFC) was introduced by Gupta and McKeown in 1999 (Pankaj Gupta and Nick McKeown, *Packet Classification on Multiple Fields*, ACM SIGCOMM 1999). RFC shares some similarities with BV, while also providing some differences. As with BV, RFC also uses rule bit vectors where the $i^{th}$ bit is set if the $i^{th}$ rule is a potential match. (Actually, to be more accurate, there is a small difference between the rule bit vectors of BV and RFC; however, it will be shown that this difference does not exist if the process deals solely with prefixes (e.g., if port ranges are converted to prefixes)). The differences are in how the rule bit vectors are constructed and used. During the construction of the lookup data structure, RFC gives each unique rule bit vector an ID. The RFC lookup process deals only with these IDs (i.e., the rule bit vectors are hidden). However, this construction of the lookup data structure is based upon rule bit vectors.

A cross-producting algorithm was introduced concurrently with BV by Srinivasan et al. (V. Srinivasan, S. Suri, G. Varghese and M. Waldvogel, *Fast and Scalable Layer*4 *Switching*, ACM SIGCOMM 1998). The cross-producting algorithm assigns IDs to unique values of prefixes, port ranges, protocol values. This effectively provides IDs for rule bit vectors (as will be discussed below). During lookup time, cross-producting identifies these IDs using trie lookups for each field. It then concatenates all the IDs for the dimension fields (five in the examples herein) to form a key. This key is used to index a hash table to find the highest-priority matching rule.

The BV algorithm performs cross-producting of rule bit vectors at runtime, using hardware (e.g., the ANDing of rule bit vectors is done by using plenty of AND gates). This reduces memory consumption. Meanwhile, cross-producting operations are intended to be implemented in software. Under cross-producting, IDs are combined (via concatenation), and a single memory access is performed to lookup the hash key index in the hash table. One problem with this approach, however, is that it requires a large number of entries in the hash table, thus consuming a large amount of memory.

RFC is a hybrid of BV and cross-producting, and is intended to be a software algorithm. RFC takes the middle path between BV and cross-producting; it employs IDs for rule bit vectors like cross-producting, but combines the IDs in multiple memory accesses instead of a single memory access. By doing this, RFC saves on memory compared to cross-producting.

A key contribution of RFC is the novel way in which it identifies the rule bit vectors. Whereas BV and cross-producting identify the rule bit vectors and IDs using trie lookups, RFC does this in a single dependent memory access.

The RFC lookup procedure operates in "phases". Each "phase" corresponds to one dependent memory access during lookup; thus, the number of dependent memory accesses is equal to the number of phases. All the memory accesses within a given phase are performed in parallel.

An exemplary RFC lookup process is shown in FIG. 3*a*. Each of the rectangles with an arrow emanating therefrom or terminating thereat depicts an array. Under RFC, each array is referred to as a "chunk." A respective index is associated with each chunk, as depicted by the dashed boxes containing an IndexN label. Exemplary values for these indices are shown in Table 1, below:

TABLE 1

| Index | Value |
|---|---|
| Index1 | First 16 bits of source IP address of input packet |
| Index2 | Next 16 bits of source IP address of input packet |
| Index3 | First 16 bits of destination IP address of input packet |
| Index4 | Next 16 bits of destination IP address of input packet |
| Index5 | Source port of input packet |
| Index6 | Destination port of input packet |
| Index7 | Protocol of input packet |
| Index8 | Combine(result of Index1 lookup, result of Index2 lookup) |
| Index9 | Combine(result of Index3 lookup, result of Index4 lookup) |
| Index10 | Combine(result of Index5 lookup, result of Index6 lookup, result of Index7 lookup) |
| Index11 | Combine(result of Index8 lookup, result of Index9 lookup) |
| Index12 | Combine(result of Index10 lookup, result of Index11 lookup) |

The matching rule ultimately obtained is the result of the Index12 lookup.

The result of each lookup is a "chunk ID" (Chunk IDs are IDs assigned to unique rule bit vectors). The way these "chunk IDs" are calculated is discussed below.

As depicted in FIG. 3*a*, the zeroth phase operates on seven chunks 300, 302, 304, 306, 308, 310, and 312. The first phase operates on three chunks 314, 316, and 318, while the second phase operates on a single chunk 320, and the third phase operates on a single chunk 322. This last chunk 322 stores the rule number corresponding to the first set bit. Therefore, when a index lookup is performed on the last chunk, instead of getting an ID, a rule number is returned.

The indices for chunks 300, 302, 304, 306, 308, 310, and 312 in the zeroth phase respectively comprise source address bits 0-15, source address bits 16-31, destination address bits 0-15, destination address bits 16-31, source port, destination port, and protocol. The indices for a later (downstream) phase are calculated using the results of the lookups for the previous (upstream) phase. Similarly, the chunks in a later phase are generated from the cross-products of chunks in an earlier phase or phases. For example, chunk 314 indexed by Index8 has two arrows coming to it from the top two chunks (300 and 302) of the zeroth phase. Thus, chunk 314 is formed by the cross-producting of the chunks 300 and 302 of the zeroth phase. Therefore, its index, Index8 is given by:

Index8=(Result of Index1 lookup*Number of unique
values in chunk 302) +Result of Index2 lookup.

In another embodiment, a concatenation technique is used to calculate the ID. Under this technique, the ID's (indexes) of the various lookups are concatenated to define the indexes for the next (downstream) lookup.

The construction of the RFC lookup data structure will now be described. The construction of the first phase (phase 0) is different from the construction of the remaining phases (phases greater than 0). However, before construction of these phases are discussed, the similarities and differences between the RFC and BV rule bit vectors will be discussed.

In order to understand the difference between BV and RFC bit vectors let us look at an example. Suppose we have the three ranges shown in Table 2 below. BV would construct three bit vectors for this table (one for each range). Let us assume for now that ranges are not broken up into prefixes. Our motivation is to illustrate the conceptual difference between RFC and BV rule bit vectors. (If we are dealing only with prefixes, the RFC and BV rule bit vectors are the same).

TABLE 2

| Rule # | Range | BV bitmap (We have to set for all possible matches) |
|---|---|---|
| Rule1 | 161, 165 | 111 |
| Rule2 | 163, 168. | 111 |
| Rule3 | 162, 166. | 111 |

RFC constructs five bit vectors for these three ranges. The reason for this is that when the start and endpoints of these 3 ranges are projected onto a number line, they result in five distinct intervals that each match a different set of rules { (161, 162), (162, 163), (163, 165), (165, 166), (166, 168) }, as schematically depicted in FIG. 4a. RFC constructs a bit vector for each of these five projected ranges (e.g., the five bit vectors would be {100, 110, 111, 011, 001}).

Let us look at another example (ignoring other fields for simplicity). In the foregoing example, RFC produced more bit vectors than BV. In the example shown in Table 3 below, RFC will produce fewer bit vectors than BV. Table 3 shown below depicts a 5-rule database.

TABLE 3

| Rule 1: | eq www | udp | Ignore other fields for this example |
|---|---|---|---|
| Rule 2: | range 20-21 | udp | Ignore other fields for this example |
| Rule 3: | eq www | tcp | Ignore other fields for this example |
| Rule 4: | gt 1023 | tcp | Ignore other fields for this example |
| Rule 5: | gt 1023 | tcp | Ignore other fields for this example |

For this example, there are four unique bit vectors for the destination ports. These are constructed by projecting the ranges onto a number line. These four bit vectors and their corresponding sets are shown below in Table 4. In this instance, all the destination ports in a set share the same bit vector.

TABLE 4

| {20, 21} | 01000 |
|---|---|
| {1024-65535} | 00011 |
| {80} | 10100 |
| {0-19, 22-79, 81-1023} | 00000. |

Similarly, we have two bit vectors for the protocol field. These correspond to {tcp} and {udp}. Their values are 00111 and 11000.

The previous examples used non-prefix ranges (e.g., port ranges). By non-prefix ranges, we mean ranges that do not begin and end at powers of two (bit boundaries). When prefixes intersect, one of the prefixes has to be completely enclosed in the other. Because of this property of prefixes, the RFC and BV bit vectors for prefixes would be effectively the same. What we mean by "effectively" is illustrated with the following example for prefix ranges shown in Table 5 and schematically depicts in FIG. 4b:

TABLE 5

| Rule# | Prefix | BV bitmap | RFC bitmap |
|---|---|---|---|
| Rule 1: | 202/8 | 100 | Non-existent |
| Rule 2: | 202.128/9 | 110 | 110 |
| Rule 3: | 202.0/9 | 101 | 101 |

The reason the RFC bitmap for 202/8 is non-existent is because it is never going to be used. Suppose we put the three prefixes 202/8, 202.128/9, 202.0/9 into a trie. When we perform a longest match lookup, we are never going to match the /8. This is because both the /9s completely account for the address space of the /8. A longest match lookup is always going to match one of the /9s only. So BV might as well discard the bitmap 100 corresponding to 202/8 since it is never going to be used.

With reference to the 5-rule example shown in Table 3 above, Phase 0 proceeds as follows. There are four unique bit vectors for the destination ports. These are constructed by projecting the ranges onto a number line. These four bit vectors and their corresponding sets are shown below in Table 6, wherein all the destination ports in a set share the same bit vector. Similarly, we have two bit vectors for the protocol field. These correspond to {tcp} and {udp}. Their values are 00111 and 11000.

TABLE 6

| Destination ports | Rule bit vector |
|---|---|
| {20, 21} | 01000 |
| {1024-65535} | 00011 |
| {80} | 10100 |
| {0-19, 22-79, 81-1023} | 00000. |

For the above example, we have four destination port bit vectors and two protocol field bit vectors. Each bit vector is given an ID, with the result depicted in Table 7 below:

TABLE 7

|  | Chunk ID | Rule bit vector |
|---|---|---|
| Destination Ports |  |  |
| {20, 21} | ID 0 | 01000 |
| {1024-65535} | ID 1 | 00011 |
| {80} | ID 2 | 10100 |
| {0-19, 22-79, 81-1023}. | ID 3 | 00000 |
| Protocol |  |  |
| {tcp} | ID 0 | 00111 |
| {udp} | ID 1 | 11000 |

Recall that the chunks are integer arrays. The destination port chunk is created by making entries 20 and 21 hold the value 0 (due to ID 0). Similarly, entries 1024-65535 of the array (i.e. chunk) hold the value 1, while the 80$^{th}$ element of the array holds the value 2, etc. In this manner, all the chunks for the first phase are created. For the IP address prefixes, we split the 32-bit addresses into two halves, with each half being used to generate a chunk. If the 32-bit address is used as is, a 2^32 sized array would be required. All of the chunks of the first phase have 65536 (64 K) elements except for the protocol chunk, which has 256 elements.

In BV, if we want to combine the protocol field match and the destination port match, we perform an ANDing of the bit vectors. However, RFC does not do this. Instead of ANDing the bit vectors, RFC pre-computes the results of the ANDing. Furthermore, RFC pre-computes all possible ANDings—i.e. it cross-products. RFC accesses these pre-computed results by simple array indexing.

When we cross-product the destination port and the protocol fields, we get the following cross-product array (each of the resulting unique bit vectors again gets an ID) shown in Table 8. This cross-product array is read using an index to find the result of any ANDing.

TABLE 8

| IDs which were cross-producted (PortID, ProtocolID) | Result | Unique ID |
|---|---|---|
| (ID 0, ID 0) | 00000 | ID 0 |
| (ID 0, ID 1) | 01000 | ID 1 |
| (ID 1, ID 0) | 00011 | ID 2 |
| (ID 1, ID 1) | 00000 | ID 0 |
| (ID 2, ID 0) | 00100 | ID 3 |
| (ID 2, ID 1) | 10000 | ID 4 |
| (ID 3, ID 0) | 00000 | ID 0 |
| (ID 3, ID 1) | 00000 | ID 0 |

The cross-product array comprises the chunk. The number of entries in a chunk that results from combining the destination port chunk and the protocol chunk is 4*2=8. The four IDs of the destination port chunk are cross-producted with the two IDs of the protocol chunk.

Now, suppose a packet whose destination port is 80 (www) and protocol is TCP is received. RFC uses the destination port number to index into a destination port array with 2^16 elements. Each array element has an ID that corresponds to its array index. For example the 80$^{th}$ element (port www) of the destination port array would have the ID 2. Similarly, since tcp's protocol number is 6, the sixth element of the protocol array would have the ID 0.

After RFC finds the IDs corresponding to the destination port (ID 10) and protocol (ID 0), it uses these IDs to index into the array containing the cross-product results. (ID 2,ID 0) is used to lookup the cross-product array shown above in Table 8, returning ID 3. Thus, by array indexing, the same result is achieved as a conjunction of bit vectors.

Similar operations are performed for each field. This would require that array for the IP addresses to be 2^32 in size. Since this is too large, the source and destination prefixes are looked up in two steps, wherein the 32-bit address is broken up into two 16-bit halves. Each 16-bit half is used to index into a 2^16 sized array. The results of the two 16-bit halves are ANDed to give us a bit vector (ID) for the complete 32-bit address.

If we need to find only the action, the last chunk can store the action instead of a rule index. This saves space because fewer bits are required to encode an action. If there are only two actions ("permit" and "deny"), only one bit is required to encode the action.

Figure 3B:
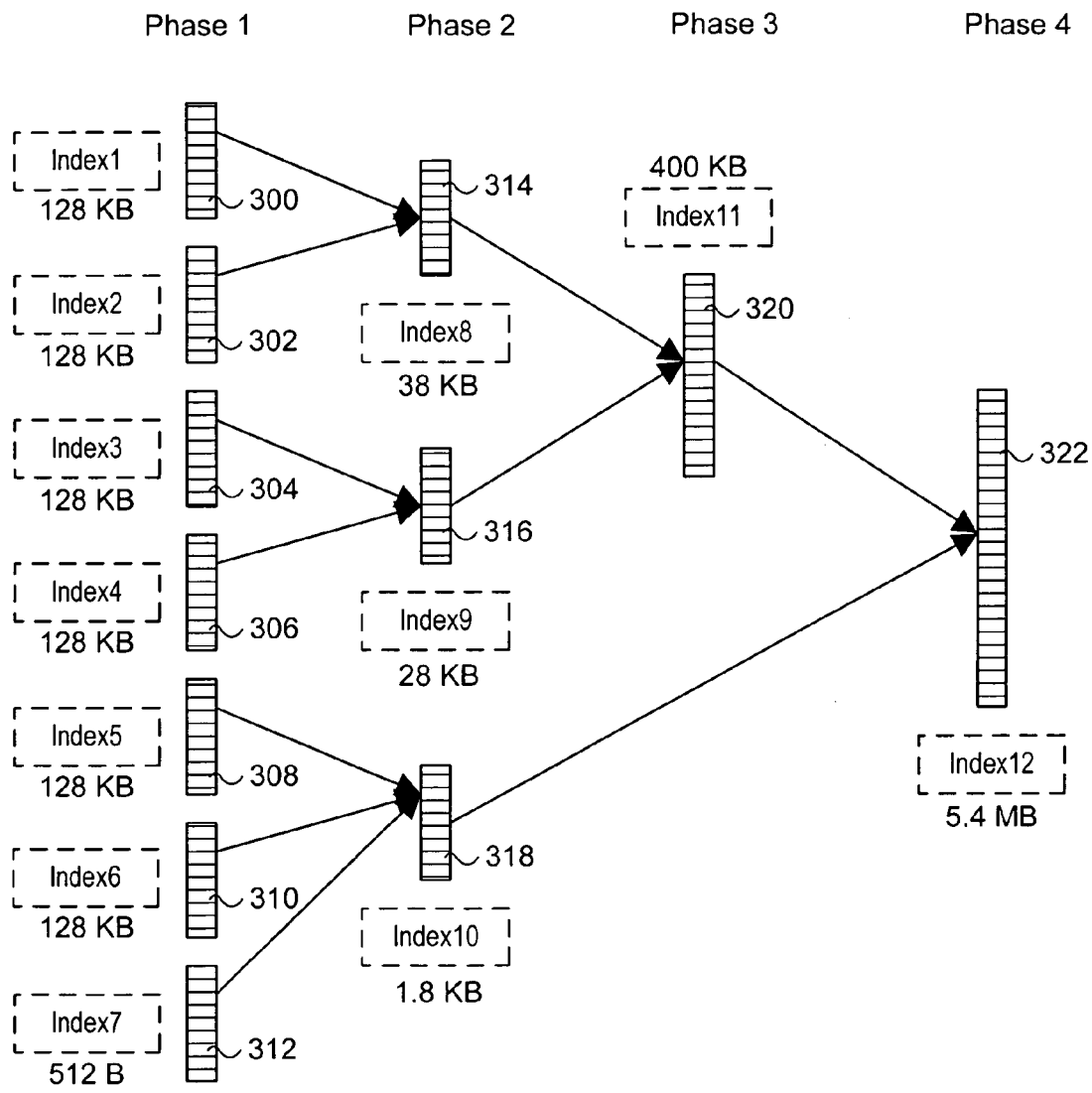
FIG. 3b is a schematic diagram illustrating the memory consumption employed for the various RFC data structures of FIG. 3a for an exemplary ACL.

The RFC lookup data structure consists only of these chunks (arrays). The drawback of RFC is the huge memory consumption of these arrays. For ACL3 (2200 rules), RFC requires 6.6 MB, as shown in FIG. 3b, wherein the memory storage breakdown is depicted for each chunk.

In accordance with aspects of the embodiments of the invention describe below, optimizations are now disclosed that significantly reduce the memory consumption problem associated with the conventional RFC scheme.

Rule Bit Optimization

Recall that the final chunk stores the actual rule indices rather than the IDs of bit vectors. The rule bit optimization significantly reduces the size of this final chunk. For ACL3, the reduction is from 2.7 million entries to approximately 1.1 million entries, with a further reduction to 0.36 million entries when combined with the split rule database scheme described below. For large ACLs, such as ACL3, the final chunk takes up most of the memory consumption—this results from the cross-producting employed by RFC.

More specifically, the size of the final chunk is the product of the number of unique bit vectors in the prefix-pair chunk and the ports-protocol chunk. The rule bit optimization reduces the size of the final chunk by reducing the number of unique bit vectors in the prefix-pair chunk and the ports-protocol chunk.

The rule bit optimization is based on the following observation. For the final chunk, only the index of the leftmost bit (i.e. index of the highest priority matching rule) is needed. This index of the leftmost bit is the highest-priority matching rule, while the final chunk contains the highest-priority matching rules.

For example, the result of the cross-product of the two bit vectors 10101 and 10110 is 10100. However, whether the third bit in the result bit vector is a '1' or not is immaterial. This is because there already is a '1' to its left (in the bit-1 position). Accordingly, the bit vector 10100 can be replaced with 10000 and yield (with respect to determining the highest-priority matching rule) the same result. This also means that similar changes can be made to the two bit vectors that were cross-producted—10101 and 10110 to 10000 and 10010—assuming that it does not affect other rules. In other words, only those set bits that contribute to a leftmost bit in the final chunk need to be kept.

Figure 5A:
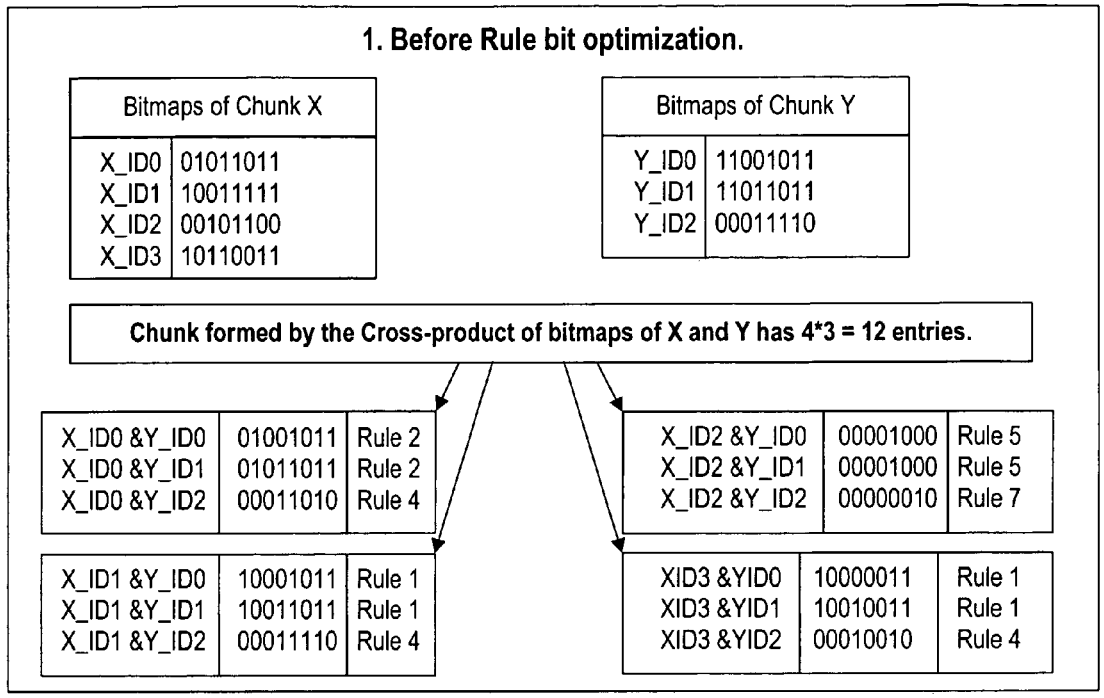
FIG. 5a is a schematic diagram depicting the result of an exemplary cross-product operation using conventional RFC techniques.
Figure 5B:
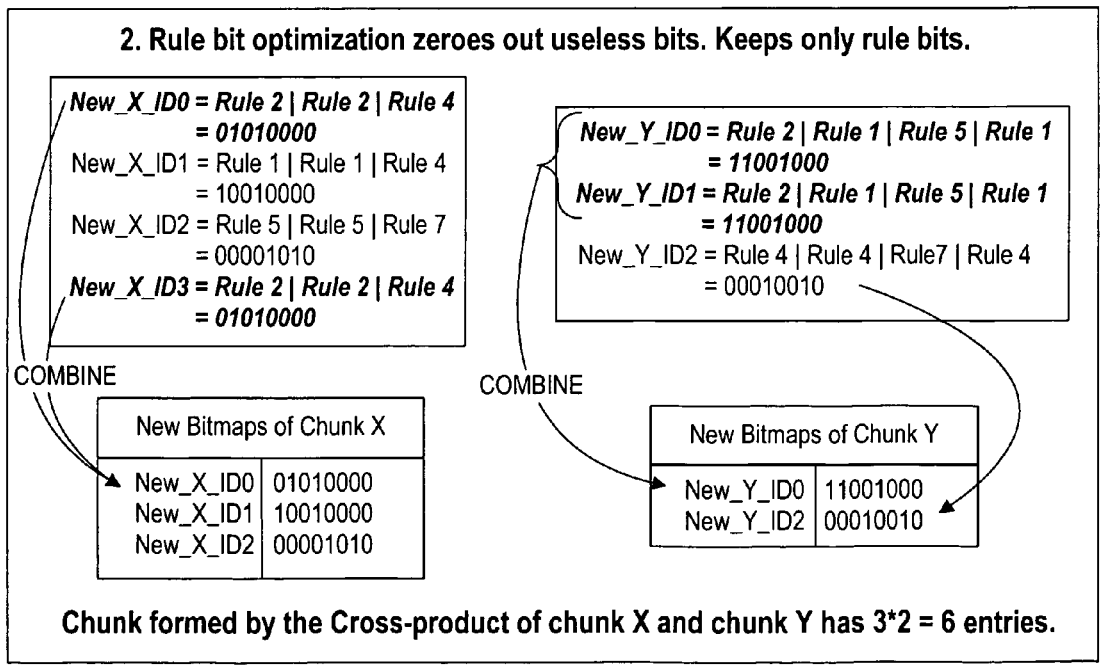
FIG. 5b is a schematic diagram illustrating the result of a similar cross-product operation using optimized bit vectors, according to one embodiment of the invention.

An example of rule bit optimization is shown in FIGS. 5a-c, and 6a-b. Under the conventional RFC approach shown in FIG. 5a, the chunk formed by the cross-product of the bitmaps for chunks X and chunk Y has X(4)*Y(3)=12 entries. As shown in FIG. 5b, the new values for X_ID0 and X_ID3 are the same; thus, these IDs can be combined into a single ID, with the other ID entry being eliminated (e.g., X_ID3 in this example). Likewise, the new values for Y_ID0 and Y_ID1 are the same, allowing one of these repeated values to be eliminated. The net result is the resultant cross-product of chunk X and chunk Y has only 6 entries. FIGS. 6a and 6b show the before and after results obtained by combining IDs and eliminating former IDs that are now inapplicable as a result of the rule bit optimization.

In a typical RFC configuration, the final chunk is produced by cross-producting the prefix-pair chunk and the ports-protocol chunk. Under one exemplary ACL, before using the rule bit optimization, the number of unique prefix pair IDs was 7400 and the number of unique ports-protocol IDs was 370. After the rule bit optimization was applied, the number of unique prefix pair IDs became 4800 and the number of unique ports-protocol IDs became 210.

This means that the size of the final chunk was reduced from 7400*370 to 4800*210. The new final chunk is only 37% the size of the original final chunk. The memory consumption of ACL3 becomes 800 KB for finding the rule index and 410 KB for finding only the action.

Note that the rule bit optimization has not increased either the number of memory accesses or the memory bandwidth. All it does is change the IDs in the penultimate phase (the prefix-pair chunk and the ports-protocol chunk). Nothing changes in the lookup process. When the prefix-pair chunk and the ports-protocol chunk are indexed, the new IDs are used instead of the old ones.

In the foregoing example, rule bit optimization is performed on the chunks used to form the final chunk. However, this is not meant to be limiting. Rather, rule bit optimization may be performed in a recursive manner for phases prior to the final phase, thus reducing the number of unique ID entries in the chunks corresponding to the earlier phases as well.

Figure 7A:
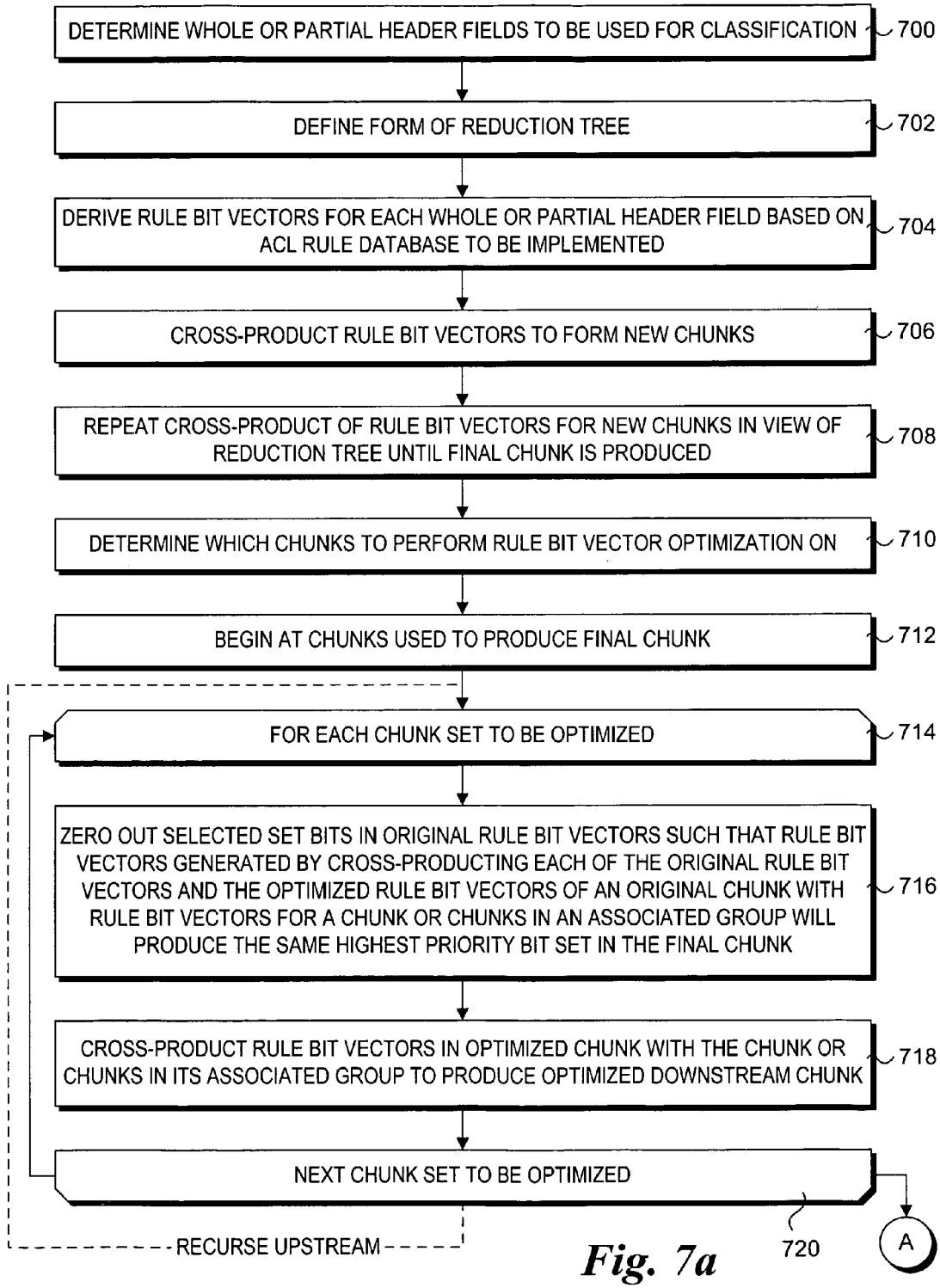
FIGS. 7*a* and 7*b* show a flowchart illustrating operations and logic for performing rule bit vector optimization, according to one embodiment of the invention.
Figure 7B:
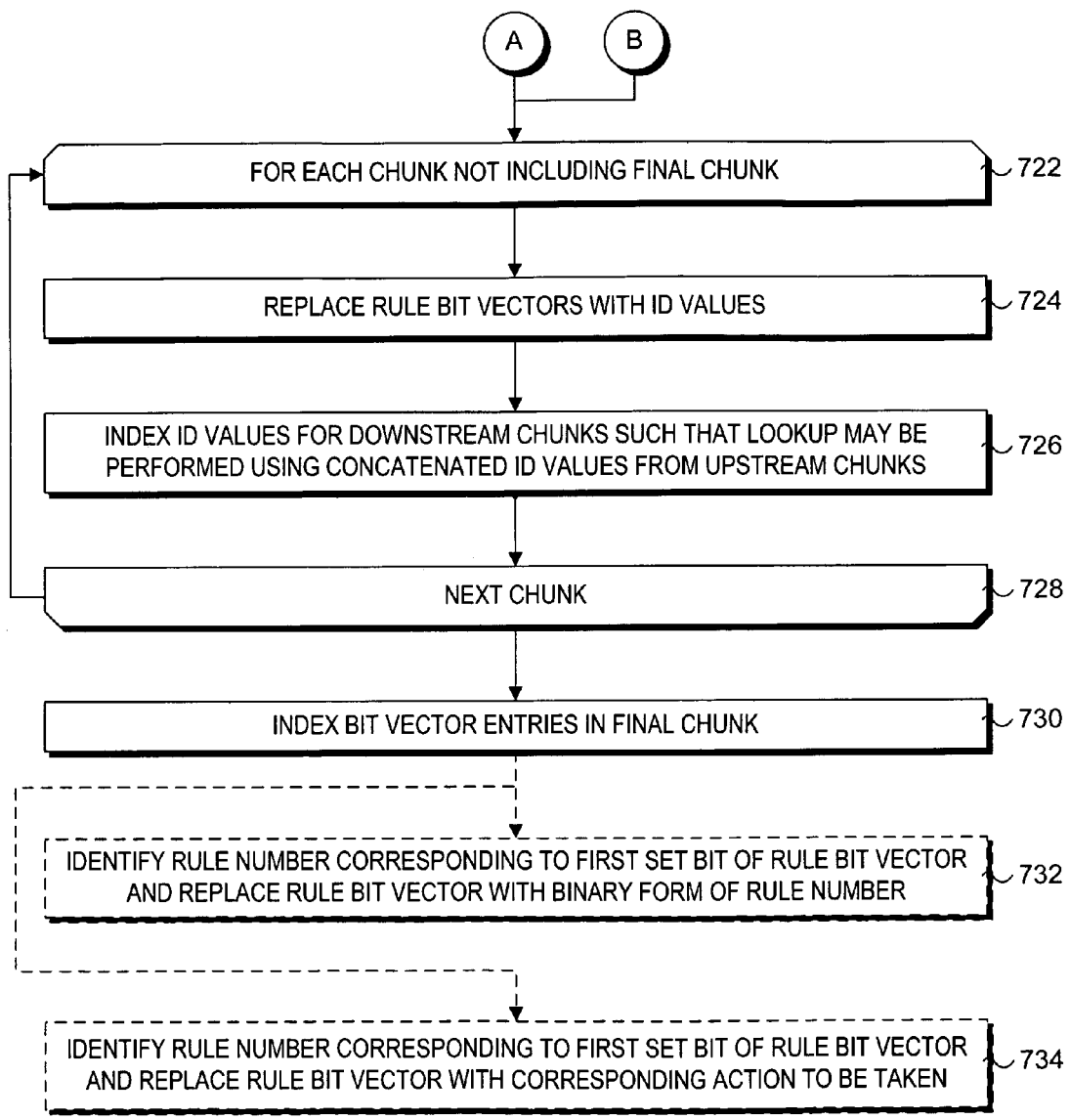

The flowchart of FIGS. 7a and 7b illustrates operations and logic for building an RFC structure using bit vector optimization in view of the foregoing discussion, according to one embodiment. The process starts in a block 700, wherein a determination is made to which whole or partial header fields are to be used for performing packet classification. In the foregoing example, these fields include the source and destination addresses, source and destination ports, and protocol fields. Furthermore, each of the source and destination address fields are split into 16-bit portions to reduce storage requirements.

In a block 702, the form of the reduction tree is defined. In general, the reduction tree may have a number of phases, with the particular configuration of the tree depending on the fields used for the classification scheme and the ACL rule database to be employed for classification. Typically, there will be three or four phases, although other numbers may also be used.

In a block 704, the rule bit vectors for each whole or partial header field being employed for the classification scheme are derived based on the ACL rule database (or other rule database) to be implemented for packet classification. This produces the initial form of the chunks for phase 0. The rule bit vectors of the phase 0 chunks are then cross-producted in a block 706 to form new phase 1 chunks. As depicted by a block 708, this cross-producting operation is repeated for the chunks along the branches of the reduction tree until a final chunk is produced. Up to this point, the operations correspond to the conventional RFC technique.

Rule bit vector optimization begins at a block 710, wherein a determination is made to which chunks are to be optimized. From a storage standpoint, the optimization of rule bit vectors in the upstream chunks from which an optimized downstream chunk is produced results in no benefit, since the same number of entries are maintained before and after rule bit optimization such that the RFC indexing scheme (described in further detail below) functions correctly. However, the number of unique rule bit vectors is reduced. Thus, the number of rule bit vectors that are cross-producted to produce a downstream chunk are reduced, substantially reducing the number of rule bit vectors in the downstream chunk. In view of this, the rule bit vectors themselves are optimized in the upstream chunks, while the downstream chunk as a whole is optimized. For convenience, these optimizations will be referred to as being applied to a "chunk set," wherein the chunk set includes the upstream chunks containing the rule bit vectors that are optimized and the downstream chunk that is optimized after cross-producting the upstream chunks.

In the illustrated embodiment, we begin at the chunks used to produce the final chunk, as depicted by a block 712. Since the final chunk is much larger than any of the other chunks, it is generally most beneficial to reduce its size first. In some implementations, the final chunk is the only chunk that will need to be optimized to produce a substantial savings in memory requirements.

As depicted by the start and end loop blocks 714 and 720, the operations of blocks 716 and 718 are performed for each chunk set to be optimized. In a block 716, the rule bit vectors in the original chunks produced by the RFC operations above are optimized. This process begins by optimizing the rule bit vectors used to form the final chunk, and then may be recursively performed on further upstream chunks, if desired. For the final chunk, the optimization entails zeroing out selected bits in the rule bit vectors for the chunks that are cross-producted to produce the final chunk such that the resultant rule bit vector for the final chunk has the same highest priority bit set as would be the case as if the original rule bit vectors were cross-producted. Since the first set bit (i.e., the highest priority rule bit) of the rule bit vectors in the final chunk identifies the rule to be used for packet forwarding, there is no need to consider any other bits. In accordance with the principles discussed above, the operation of blocks 716 discards the "useless" bits for the chunks used to form the final chunk.

After the rule bit vectors in the upstream chunks for a given set are optimized, they are cross-producted in block 718 to produce an optimized downstream chunk (e.g., an optimized final chunk in this instance).

In some cases, the optimization scheme may be applied to chunks further upstream from the final chunk. This may be accomplished by performing the operations of blocks 716 and 718 in a recursive manner. Under this technique, the rule bit vectors and resultant cross-producted optimized chunk are optimized for an upstream set of chunks, and then the rule bit vectors from that optimized chunk are optimized to produce a new optimized downstream chunk, and so on. However, the scheme must be implemented in a manner such that the same rule bit in the final chunk is selected as would be selected using the original rule bit vectors for all phases.

After the operations of FIG. 7a are performed, the process advances to a continuation block "A" in FIG. 7b. The operations of FIG. 7b correspond to the conventional RFC operations that replace rule bit vectors in all but the last chunk with equivalent identifiers (e.g. ID values). The ID values function as pointers to subsequent entries in downstream chunks that may be accessed using RFC's indexing scheme.

As depicted by start and end loop blocks 722 and 728, the operations of blocks 724 and 726 are performed for each chunk except for the final chunk. In block 724, the rule bit vectors are replaced with their equivalent ID values, wherein each unique rule bit vector has a unique ID value. The ID values are then indexed in block 726 in a manner that enables an ID value to be looked up in a downstream chunk based on a concatenation of the ID values from the upstream chunks from which the downstream chunk is produced. These operations are performed until the final chunk is reached. In conjunction with the RFC indexing scheme, the bit vectors for the final chunk are indexed in a block 730.

At this point, the final chunk contains the original rule bit vectors derived from the crossproducting of upstream chunks in the reduction tree. However, only the first set bit is applicable for defining the highest priority rule for each bit vector. Thus, in an optional block 732, the rule number corresponding to the first set bit in each original rule bit vector of the final chunk is identified, and then the rule bit vector is replaced with the binary value for the rule number.

As depicted by another optional block 734, the rule number corresponding to the first set bit in each original rule bit vector of the final chunk is identified, and then the rule bit vector is replaced with the actual action defined by the rule. For instance, the action might be forward or drop, as respectively represented by a '1' or '0'. This saves an additional rule action lookup.

Database Splitting

Database splitting partitions a rule database (e.g., and ACL database) into multiple parts. This results in (1) effective reduction of cross-producting; and (2) increases the effectiveness of the rule bit optimization when combined with rule bit optimization.

The amount of memory consumed by cross-producting is equal to the number of values being cross-producted (e.g., if we have 10 unique source prefixes, 20 unique destination prefixes, 5 unique source port ranges, 5 unique destination ranges and 2 unique protocols, the number of cross-products is 10*20*5*5*2=10,000. Suppose this database is split into two parts, and the two parts are as follows:

Part 1: 6 unique source prefixes, 15 unique destination prefixes, 2 unique source port ranges, 2 unique destination port ranges and 2 unique protocols.

Part 2: 6 unique source prefixes, 10 unique destination prefixes, 3 unique source port ranges, 3 unique destination port ranges and 2 unique protocols.

The number of cross-products is as follows:
Part 1:6*15*2*2*2=720.
Part 2:6*10*3*3*2=1080.

Total number of cross-products=720+1080=1800, which is significantly less than 10,000. Since RFC employs a controlled cross-producting technique, it inherently benefits from this optimization.

The database splitting optimization effectively splits the database into multiple parts based on split criteria comprising header field values or ranges. For example, ACL3 is split into non-TCP rules (e.g., protocol=UDP and others non-TCP rules) and TCP rules. A packet cannot be both a UDP and a TCP packet). Note that protocol "don't care" rules are included in both parts of the database (i.e. rule with protocol=IP are replicated). In addition, we could also split on other fields. Furthermore, an exact match field is not required in order to split. However, every split is not guaranteed to produce an improvement. The split should be intelligent (e.g. one heuristic is to have as few common rules as possible in the two split portions).

Database splitting also increases the effectiveness of the rule bit optimization. The rule bit optimization reduces the size of the final chunk by reducing the number of unique rule bit vectors in this penultimate chunk. The reduction of unique rule bit vectors happens because the prefix-pair chunk rule bit vectors are effectively the OR of the highest-priority rules matched by them. For example, suppose we have a prefix-pair chunk rule bit vector x and two ports-protocol chunk rule bit vectors y1 and y2. Further suppose FFS(x & y1)=Rule a and FFS(x & y2)=Rule b. The rule bit optimization sets the rule bit vector of x to be Rule a | Rule b.

After applying the rule bit optimization for ACL3 (the largest ACL defined at this point), the final chunk still included a million-plus entries. The sizes of the prefix-pair chunk and the ports-protocol chunk was 4800 and 210 respectively. When the database is split into two parts (TCP and non-TCP), the sizes are as follows:

TABLE 9

| Rule type | Prefix pair chunk | Protocol Chunk | Final Chunk |
| --- | --- | --- | --- |
| Non-TCP | 1000 | 40 | 40000 |
| TCP | 1844 | 162 | 301000 |

Total number of entries in the two final chunks is less than 360,000. Together, the rule bit and database splitting optimizations reduced the final chunk size from 2.7 million entries to 360,000 entries. By further splitting the TCP rules into two sets, a further reduction in the number of final chunk entries is obtained.

Figure 8:
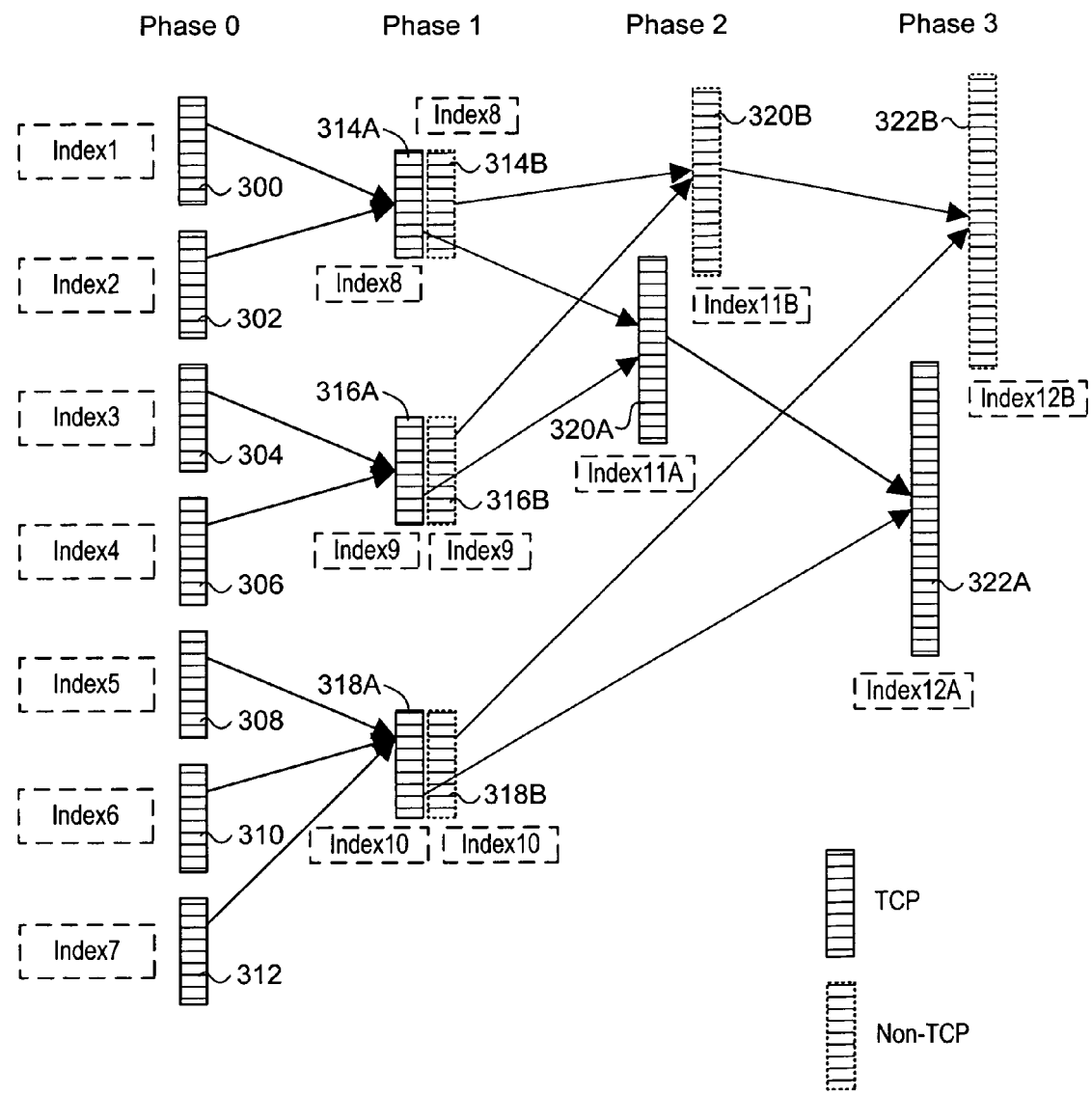
FIG. 8 is a schematic diagram illustrating an exemplary implementation of rule database splitting, according to one embodiment of the invention.
Figure 9:
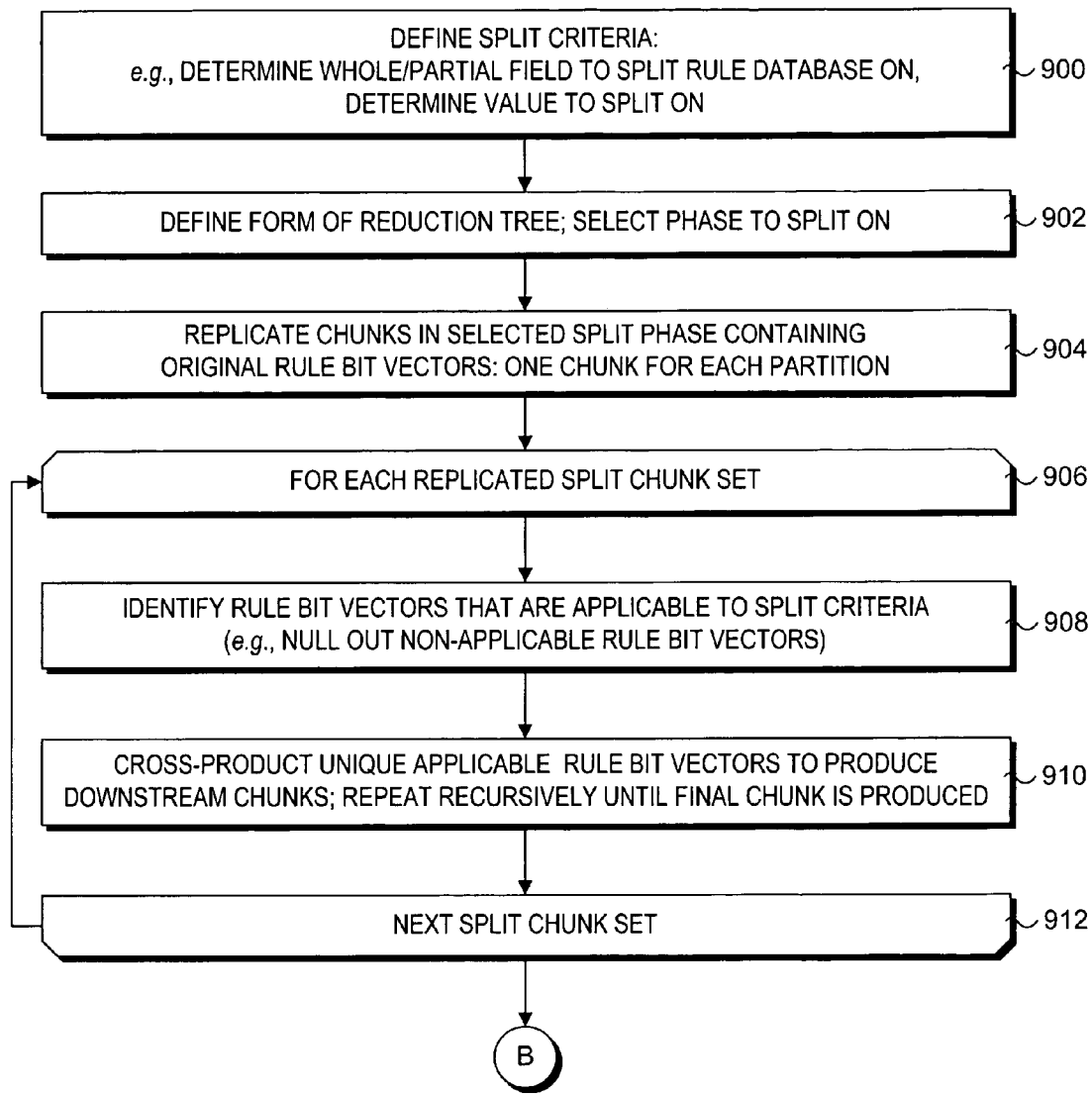
FIG. 9 shows a flowchart illustrating operations and logic for generating partitioned data structures using rule database splitting, according to one embodiment of the invention.

An exemplary augmented RFC structure obtained via one embodiment of the rule database splitting scheme is shown in FIG. 8, while a flowchart illustrating operations and logic for building the augmented RFC structure are shown in FIGS. 9 and 7b. The process begins in a block 900, wherein the split criteria is defined. Typically, the split criteria will be based on values in a whole or partial packet header field, although other forms of split criteria may be used. In the example illustrated in FIG. 8, the split criteria is to separate out (partition) the lookup data structures for TCP and non-TCP packets. In general, a split may be performed on two or more values by extending the operations depicted in FIG. 8 based on the applicable number of partitions.

In a block 902, the form of the reduction tree is defined, and the phase to split on is selected. FIG. 8 shows an example of database splitting corresponding to the previous RFC scheme depicted in FIG. 3a, wherein a split is performed at phase 1. However, splits may be implemented at other phases as well.

In a block 904, each original chunk for the selected split phase is replicated, with the number of chunks being replicated corresponding to the number of partitions. For example, splitting on TCP and non-TCP results in two partitions, and thus two copies of each chunk in phase 1. In FIG. 8, each of previous chunks 314, 316, and 318 (of FIG. 3a) are replicated, as depicted by chunks 314A and 314B, chunks 316A and 316B, and chunks 318A and 318B.

The operations of blocks 908 and 910 are performed for each replicated split chunk set, as depicted by start and end loop blocks 906 and 912. In this context, a replicated split chunk set corresponds to all of the chunks formed downstream for the chunks associated with a particular partition, beginning at the split phase. During this process, the rule bit vectors that are applicable to the split criteria for a given partition are identified in block 908. For example, suppose that chunk 314A corresponds to the TCP partition. Accordingly, any rule bit vectors in chunk 314A that do not have any rules that map to the TCP protocol are not applicable for any further processing with respect to downstream data structures to be generated for the TCP partition. In one embodiment, these such non-applicable rule bit vectors are simply null out. In another embodiment, a marker can be set to mark which rule bit vectors are applicable, and which ones can be ignored.

In block 910, the unique applicable rule bit vectors for chunks in associated groups are cross-producted to produce downstream chunks in a manner similar to that used to build a conventional RFC data structure. This cross-producting operation is repeated recursively until a final chunk is produced for the given partition.

In the example of FIG. 8, the applicable unique bit vectors of chunks 314A and 316A are cross-producted to produce a chunk 320A. The applicable unique bit vectors of chunk 318A and the unique bit vectors of chunk 320A (at this point all of the bit vectors will be applicable for the current partition for which data structures are being generated) are cross-producted to produce a final chunk 322A. Thus, each of chunks 314A, 316A, 318A, 320A and 322A correspond to the TCP partition.

Meanwhile, the data structures for the non-TCP partition are generated. During this process, the applicable unique bit vectors of chunks 314B and 316B are cross-producted to produce a chunk 320B. Then, the applicable unique bit vectors of chunk 318B and the unique bit vectors of chunk 320B are cross-producted to produce a final chunk 322B.

Since the number of applicable unique bit vectors in the phase 1 split chunks are typically much less that the number of unique bit vectors in the original chunks, the size of each downstream chunk is reduced. However, the number of downstream chunks is increased (doubled in this example). Yet, the combined size of the downstream chunks will often be less (sometimes significantly less) than the size of the original downstream chunks they are replacing. This is particularly true for final chunks. As discussed above with reference to table 9, the size of the final chunks used for the TCP/non-TCP database splitting example is significantly less that the size of the single final chunk produced prior to splitting.

After the downstream chunks are generated for each partition, the process proceeds to the flowchart of FIG. 7b, where conventional RFC ID values and indexing operations are performed. This creates several new indexes, including an index 11A for chunk 320A, an index 11B for chunk 320B, and index 12A for chunk 322A, and an index 12B for chunk 322B. It is further noted that the indexes for each of the replicated chunks in the split phase remain the same, even though many of the entries in their associated chunks are useless. This is so that the RFC indexing scheme can still be employed for phases prior to the split phase.

Figure 10:
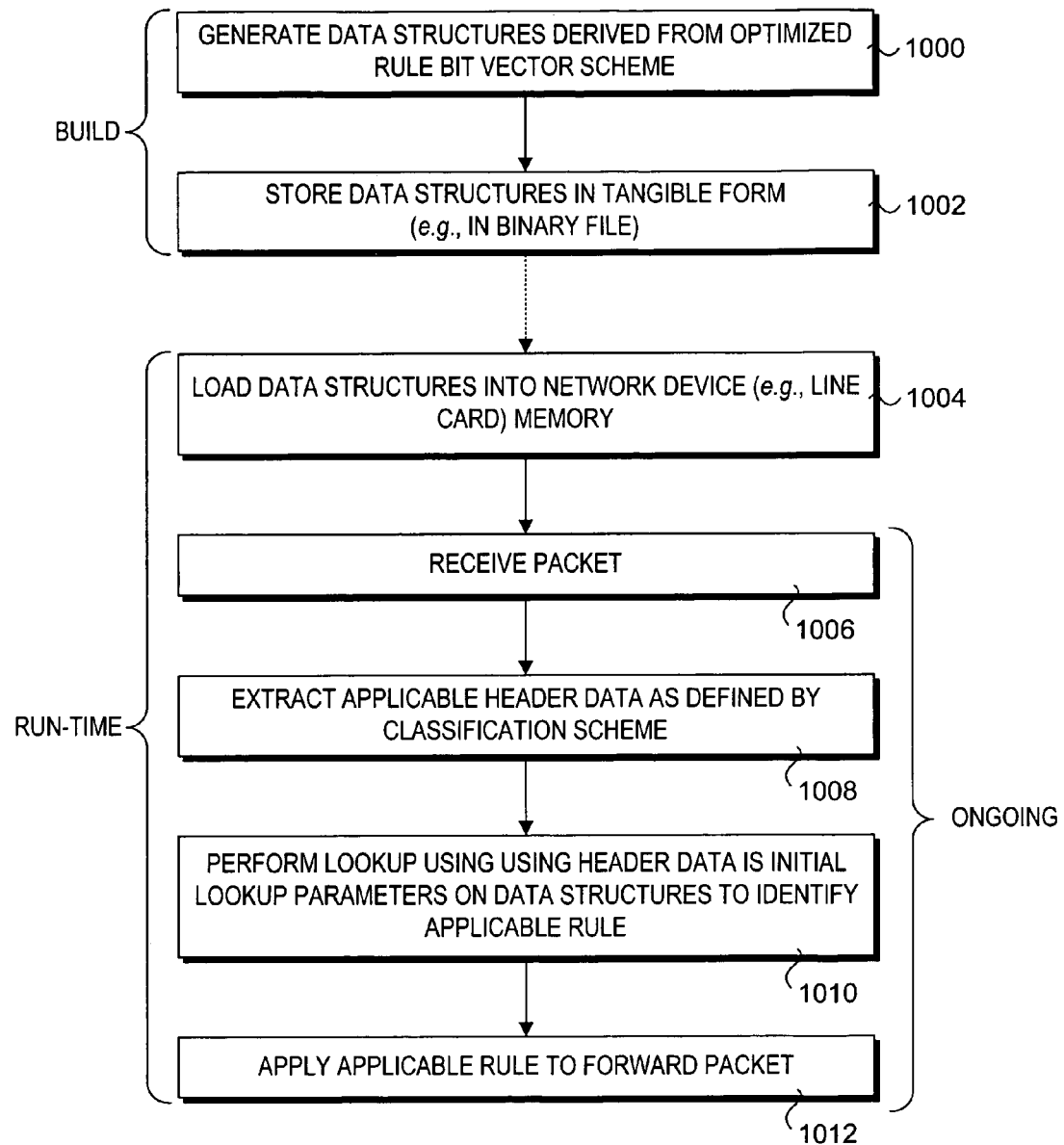
FIG. 10 is a flowchart illustrating operations performed during build and run-time phases under one embodiment of the rule bit vector optimization scheme.

FIG. 10 shows an overview of build phase and run-time phase operations corresponding to an implementation cycle for the optimized rule bit vector scheme. During the build phase, the data structures are generated using the optimized rule bit vector scheme operations discussed above, as depicted in a block 1000, and a file or the like containing the data structures is written in a block 1002 to store the data structures in a tangible form.

The remaining operations depicted in FIG. 10 correspond to run-time operations. These operations are performed by a network device (or a component in a network device, such as a line card) to perform packet classification operations implemented via the data structures. To initialize the network device, the data structures on loaded into an appropriate memory store (e.g., for a line card) in a block 1004. Typically, the data structures will be loaded into SRAM.

The operations shown in blocks 1006, 1008, 1010, and 1012 are ongoing. In block 1006 a packet is received at a port for the network device. In block 1008, applicable header data is extracted from the packet header, as defined by the packet classification scheme defined for the build phase. In block 1010, a sequence of data structure lookups is performed using the header data as initial inputs during phase 0, with subsequent lookups employing returned concatenated ID values. The sequence of lookups is performed based on the reduction tree configuration until a lookup in the final chunk is performed, which identifies the applicable rule to be employed for forwarding the packet. That rule is then applied in block 1012.

Figure 11:
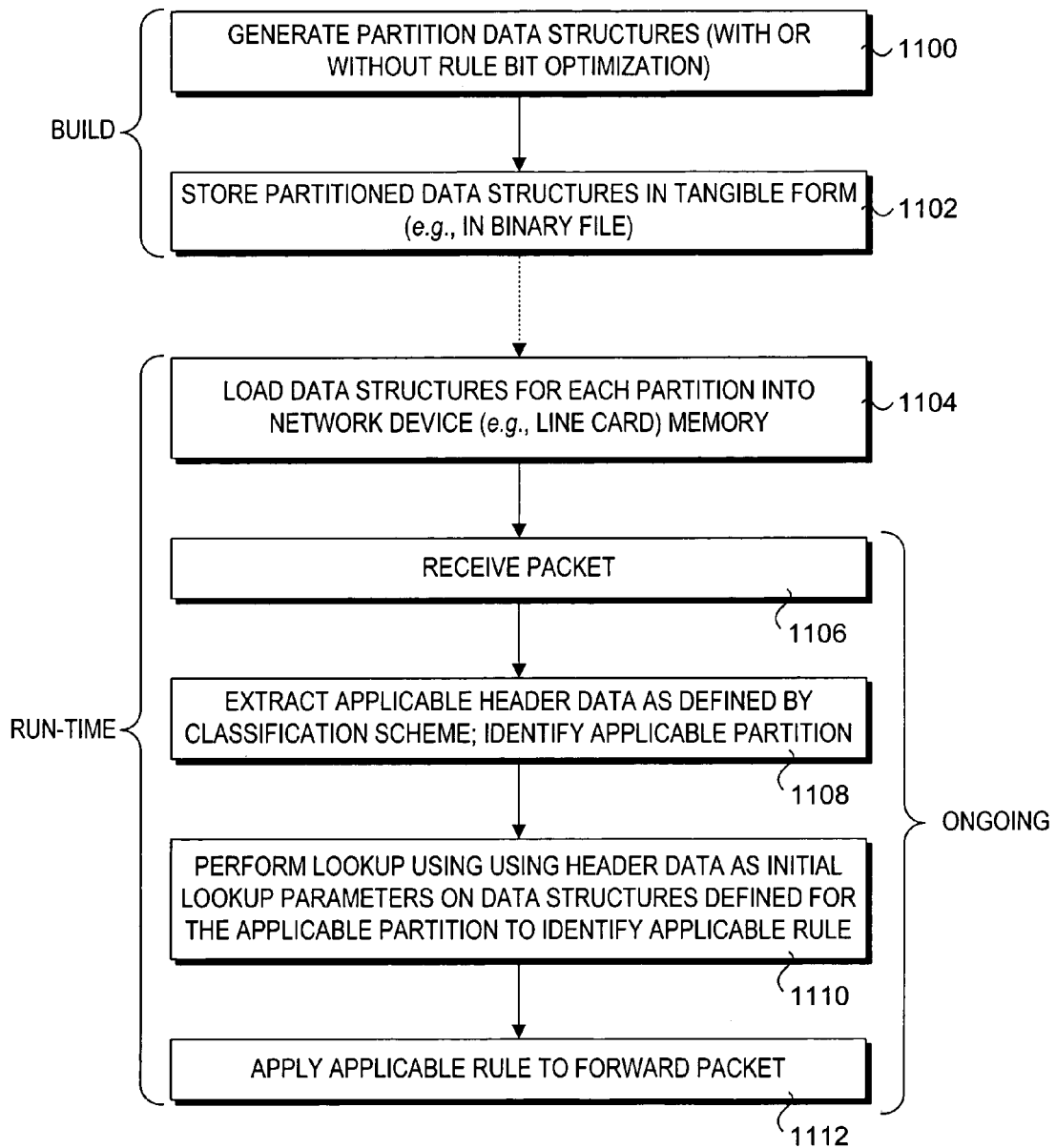
FIG. 11 is a flowchart illustrating operations performed during build and run-time phases under one embodiment of the rule database splitting scheme.

FIG. 11 shows an overview of build phase and run-time phase operations corresponding to an implementation cycle for the rule database splitting scheme with or without employing the optimized rule bit vector scheme. During the build phase, data structures are generated for each of the partitions using the rule database splitting scheme operations discussed above (an optionally, the optimized rule bit vector scheme operations discussed above if rule bit optimization is also employed), as depicted in a block 1200, and the partitioned data structures are stored in tangible form in a block 1102.

To initialize the run-time phase, the data structures for each partition are loaded into the network device memory in a block 1104. During ongoing operations, a packet is received in a block 1106, and applicable header data is extracted from the packet header, as defined by the packet classification scheme defined for the build phase, in a block 1108. Also, based on the packet header data, the applicable partition is identified. Then, in a block 1110, a sequence of data structure lookups is performed on the data structures corresponding to the applicable partition using the header data as initial inputs during phase 0, with subsequent lookups employing returned concatenated ID values. The sequence of lookups is performed based on the reduction tree configuration for the applicable partition until a lookup in the final chunk is performed, which identifies the applicable rule to be employed for forwarding the packet. That rule is then applied in block 1112.

In accordance with aspects of the embodiments described herein, various build phase and run-time phase operations may be facilitated by software programs and/or modules running on appropriate processing elements and/or systems. For example, software may be executed on a computer system to generate data structures by implementing operations corresponding to the rule bit vector optimization scheme and/or rule data base splitting scheme described above. Thus, embodiments of this invention may be used as or to support a software component executed upon some form of processing core (such as the processor of a computer) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.)

Figure 12:
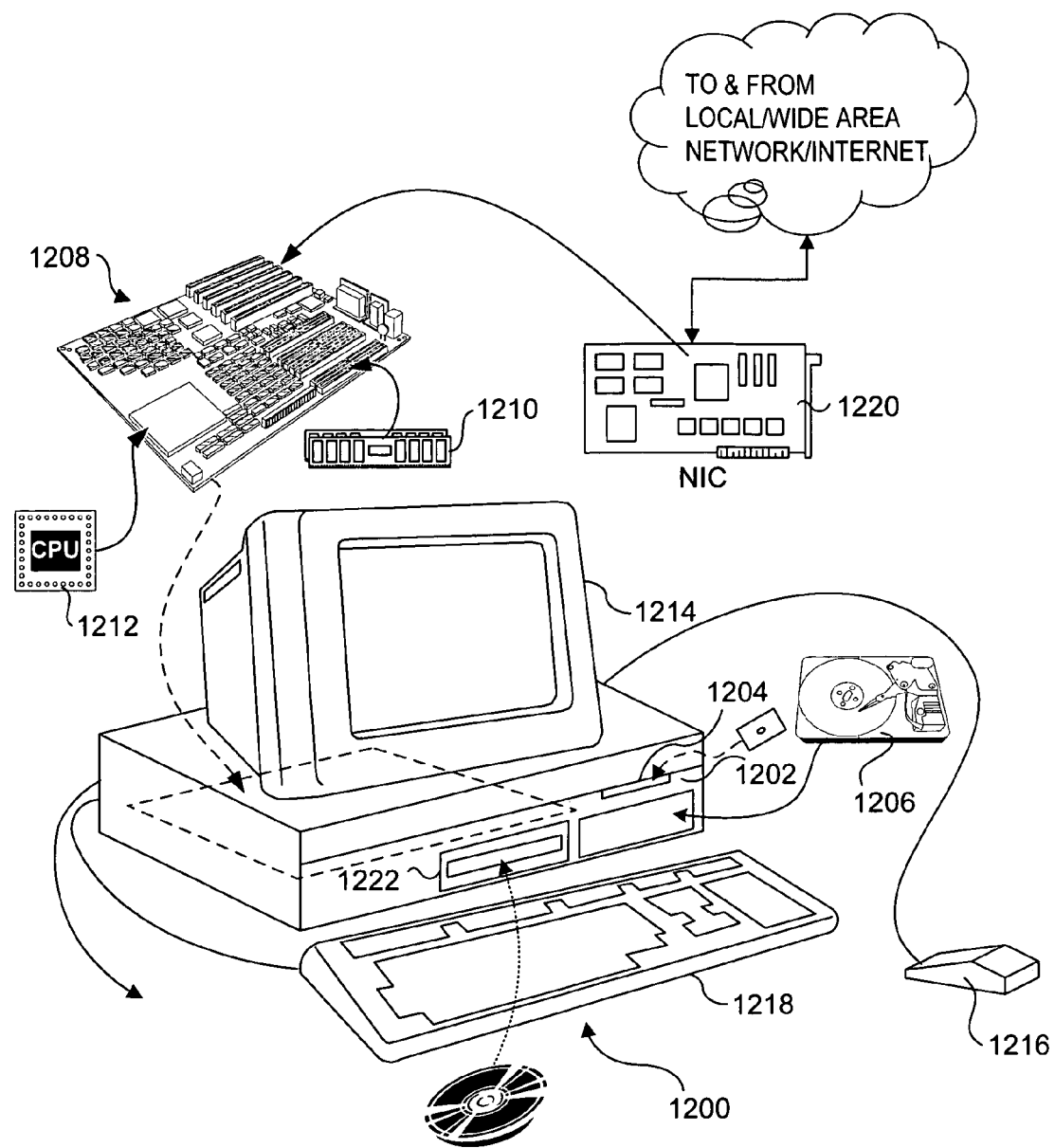
FIG. 12 is a schematic diagram of an exemplary computer system that may be used to execute software for generating data structures using the optimized rule bit vector and rule database splitting schemes described herein

With reference to FIG. 12, a generally conventional computer 1200 is illustrated, which is suitable for executing software for generating data structures using the rule bit vector optimization scheme and/or rule data base splitting scheme described above. Computer 1200 includes a processor chassis 1202 in which are mounted an optional floppy disk drive 1204, a hard drive 1206, a motherboard 1208 populated with appropriate integrated circuits including memory 1210 and one or more processors (CPUs) 1212, and a power supply (not shown), as are generally well known to those of ordinary skill in the art. It will be understood that hard drive 1206 may comprise a single unit, or multiple hard drives, and may optionally reside outside of computer 1200. A monitor 1214 is included for displaying graphics and text generated by software programs and program modules that are run by the computer. A mouse 1216 (or other pointing device) may be connected to a serial port (or to a bus port or USB port) on the rear of processor chassis 1202, and signals from mouse 1216 are conveyed to the motherboard to control a cursor on the display and to select text, menu options, and graphic components displayed on monitor 1214 by software programs and modules executing on the computer. In addition, a keyboard 1218 is coupled to the motherboard for user entry of text and commands that affect the running of software programs executing on the computer. Computer 1200 also includes a network interface card 1220 or built-in network adapter for connecting the computer to a computer network, such as a local area network, wide area network, or the Internet.

Computer 200 may also optionally include a compact disk-read only memory (CD-ROM) drive 222 into which a CD-ROM disk may be inserted so that executable files and data on the disk can be read for transfer into the memory and/or for storage on hard drive 1206 of computer 1200. Other mass memory storage devices such as an optical recorded medium or DVD drive may be included.

Software may also be executed on appropriate processing elements to perform the run-time phase operations depicted in FIGS. 10 and 11. In one embodiment, such software is implemented on a network line card implementing Intel® IPX 2xxx network processors.

Figure 13:
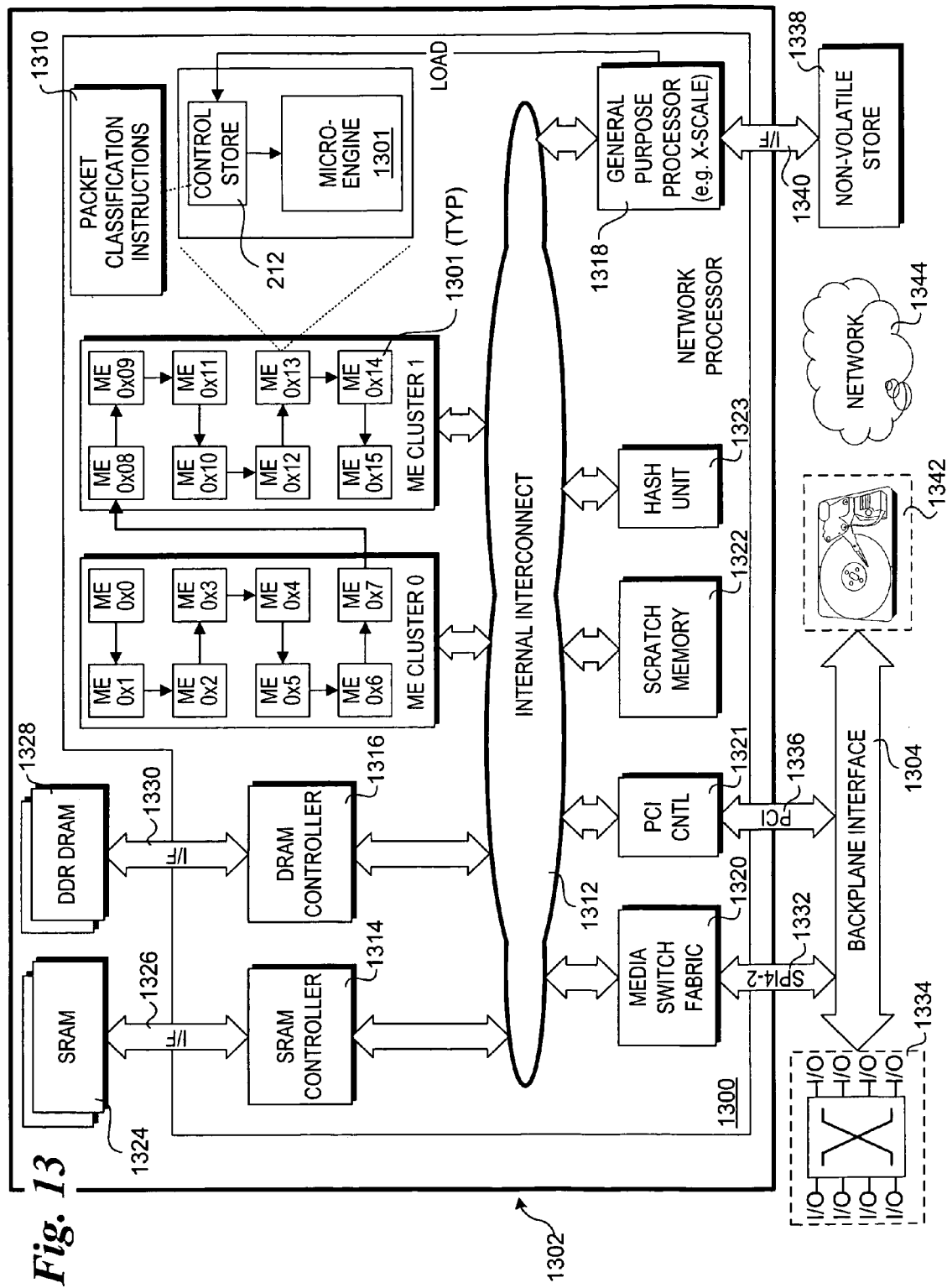
FIG. 13 is a schematic diagram of a network line card employing a network processor that may be used to execute software to support the run-time phase packet classification operations described herein.

For example, FIG. 13 shows an exemplary implementation of a network processor 1300 that includes one or more compute engines (e.g., microengines) that may be employed for executing software configured to perform the run-time phase operations described herein. In this implementation, network processor 1300 is employed in a line card 1302. In general, .ine card 1302 is illustrative of various types of network element line cards employing standardized or proprietary architectures. For example, a typical line card of this type may comprises an Advanced Telecommunications and Computer Architecture (ATCA) modular board that is coupled to a common backplane in an ATCA chassis that may further include other ATCA modular boards. Accordingly the line card includes a set of connectors to meet with mating connectors on the backplane, as illustrated by a backplane interface 1304. In general, backplane interface 1304 supports various input/output (I/O) communication channels, as well as provides power to line card 1302. For simplicity, only selected I/O interfaces are shown in FIG. 13, although it will be understood that other I/O and power input interfaces also exist.

Network processor 1300 includes n microengines 1301. In one embodiment, n=8, while in other embodiment n=16, 24, or 32. Other numbers of microengines 1301 may also be used. In the illustrated embodiment, 16 microengines 1301 are shown grouped into two clusters of 8 microengines, including an ME cluster 0 and an ME cluster 1.

In the illustrated embodiment, each microengine 1301 executes instructions (microcode) that are stored in a local control store 1308. Included among the instructions for one or more microengines are packet classification run-time phase instructions 1310 that are employed to facilitate the packet classification operations described herein.

Each of microengines 1301 is connected to other network processor components via sets of bus and control lines referred to as the processor "chassis". For clarity, these bus sets and control lines are depicted as an internal interconnect 1312. Also connected to the internal interconnect are an SRAM controller 1314, a DRAM controller 1316, a general purpose processor 1318, a media switch fabric interface 1320, a PCI (peripheral component interconnect) controller 1321, .scratch memory 1322, and a hash unit 1323. Other components not shown that may be provided by network processor 1300 include, but are not limited to, encryption units, a CAP (Control Status Register Access Proxy) unit, and a performance monitor.

The SRAM controller 1314 is used to access an external SRAM store 1324 via an SRAM interface 1326. Similarly, DRAM controller 1316 is used to access an external DRAM store 1328 via a DRAM interface 1330. In one embodiment, DRAM store 1328 employs DDR (double data rate) DRAM. In other embodiment DRAM store may employ Rambus DRAM (RDRAM) or reduced-latency DRAM (RLDRAM).

General-purpose processor 1318 may be employed for various network processor operations. In one embodiment, control plane operations are facilitated by software executing on general-purpose processor 1318, while data plane operations are primarily facilitated by instruction threads executing on microengines 1301.

Media switch fabric interface 1320 is used to interface with the media switch fabric for the network element in which the line card is installed. In one embodiment, media switch fabric interface 1320 employs a System Packet Level Interface 4 Phase 2 (SPI4-2) interface 1332. In general, the actual switch fabric may be hosted by one or more separate line cards, or may be built into the chassis backplane. Both of these configurations are illustrated by switch fabric 1334.

PCI controller 1322 enables the network processor to interface with one or more PCI devices that are coupled to backplane interface 1304 via a PCI interface 1336. In one embodiment, PCI interface 1336 comprises a PCI Express interface.

During initialization, coded instructions (e.g., microcode) to facilitate various packet-processing functions and operations are loaded into control stores 1308, including packet classification instructions 1310. In one embodiment, the instructions are loaded from a non-volatile store 1338 hosted by line card 1302, such as a flash memory device. Other examples of non-volatile stores include read-only memories (ROMs), programmable ROMs (PROMs), and electronically erasable PROMs (EEPROMs). In one embodiment, non-volatile store 1338 is accessed by general-purpose processor 1318 via an interface 1340. In another embodiment, non-volatile store 1338 may be accessed via an interface (not shown) coupled to internal interconnect 1312.

In addition to loading the instructions from a local (to line card 1302) store, instructions may be loaded from an external source. For example, in one embodiment, the instructions are stored on a disk drive 1342 hosted by another line card (not shown) or otherwise provided by the network element in which line card 1302 is installed.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method, comprising:
defining dimensions comprising whole or partial fields in a packet header to be used for packet classification;
generating a set of original rule bit vectors for each dimension, each bit in an original rule bit vector identifying a rule for handling packets based on a corresponding dimension value or range, each set of original rule bit vectors defining an original array;
grouping the original arrays into one or more groups;
optimizing a set of rule bit vectors in at least one original array to produce an optimized array, including changing selected set bits of the set of rule bit vectors, wherein vectors generated by cross-producting each of the original rule bit vectors and the optimized rule bit vectors of an original array with rule bit vectors for an array or arrays in an associated group will have the same highest priority bit set; and
for each optimized array, cross-producting the optimized rule bit vectors with original or optimized rule bit vectors in the array or arrays of the optimized array's associated group to produce a cross-producted array.

2. The method of claim 1, further comprising:
grouping the original arrays into multiple groups;
cross-producting the optimized rule bit vectors by group to produce a first set of cross-producted arrays; and
repeating the foregoing grouping, optimizing, and cross-producting operations on the first and any subsequent set of cross-producted arrays produced in a recursive manner until a single final array is produced.

3. The method of claim 2, further comprising storing the rule number corresponding to the highest priority bit set for each rule bit vector in the final array.

4. The method of claim 1, further comprising:
associating each unique optimized rule bit vector in an array with a corresponding identifier (ID) value;
storing the ID values for each array in a corresponding array; and
indexing the arrays in a manner that enables an ID value for a given array to be retrieved based on indexes derived from a combination of ID values in upstream arrays from which the given array was generated.

5. The method of claim 4, further comprising:
extracting, from a received packet, dimension values for each packet header dimension defined for packet classification;
performing a first set of lookups to locate IDs based on the dimension values;
performing subsequent lookups using the IDs obtained from each array in a recursive manner to identify a highest priority matching rule in a final array; and
employing that highest priority matching rule to handle forwarding of the packet.

6. The method of claim 1, wherein the dimensions used for packet classification include the source address, the destination address, the source port, the destination port, and the protocol of a packet header.

7. The method of claim 6, wherein each of the source and destination addresses are divided into two 16-bit portions; and the original arrays respective include entries corresponding to:
the first 16 bits of the source address;
the second 16 bits of the source address;
the first 16 bits of the destination address;
the second 16 bits of the destination address;
the source port;
the destination port; and
the protocol.

8. The method of claim 1, wherein the rule bit vectors in first and second arrays are optimized to produce a final array, the first array comprising a pre-fix pair array including entries derived from rules corresponding to source and destination addresses, and the second array comprising a ports-protocol array including entries derived from rules corresponding to source port, destination port, and protocol values.

9. A method comprising:
defining dimensions comprising whole or partial fields in a packet header to be used for packet classification;
generating a set of rule bit vectors for each dimension, each bit in a rule bit vector identifying a rule in a rule database for handling packets based on a corresponding dimension value or range, each set of rule bit vectors defining a zeroth phase chunk;
selecting split criteria used to partition the rule database;
defining a partitioned reduction tree configuration defining how a sequence of downstream chunks are to be generated for each partition in the rule database; and
in a recursive manner, for each partition, generating downstream chunks by cross-producting the rule bit vectors of upstream chunks associated with respective groups in view of the partitioned reduction tree configuration, beginning with the zeroth phase chunks, until a final chunk is generated for each partition.

10. The method of claim 9, further comprising:
associating an identifier (ID) with each rule bit vector in a chunk;
storing the IDs for each chunk in an indexed array,
wherein the index for an entry in a downstream chunk is derived from a combination of ID values from upstream chunks used to generate the downstream chunk.

11. The method of claim 9, wherein the partitioned reduction tree defines a phase at which splitting is performed, the method further comprising:
replicating, for each partition, an original chunk generated by cross-producting the rule bit vectors defined in each of a group of upstream chunks;
grouping the replicated original chunks into groups associated with a respective partition;
identifying rule bit vectors that are applicable for each chunk in a group of chunks associated with a given partition; and
cross-producting unique applicable rule bit vectors for each of the chunks associated with the group to generate a downstream chunk.

12. The method of claim 9, further comprising partitioning the rule database based on one of a value or range defines for one of the dimensions.

13. The method of claim 12, farther comprising partitioning the rule database based on values defined for a protocol field.

14. The method of claim 9, further comprising:
extracting header data from a packet;
determining how the rule for handling the packet is to be looked up based on the packet header data in view of the rule database split criteria; and
employing a multiphase lookup sequence based on the determination of how the rule for handling the packet is to be looked up, the multiphase lookup sequence involving a lookup of at least one split chunk associated with the split criteria applicable to the packet.

15. A computer-readable medium encoded with instructions capable of being executed by a computer to perform operations comprising:
- retrieving a set of original rule bit vectors for each of multiple dimensions comprising a whole or partial field in a packet header to be used for packet classification, each bit in an original rule bit vector identifying a rule for handling packets based on a corresponding dimension value or range, each set of original rule bit vectors defining an original chunk;
- reading grouping information defining a group to which each original chunk is associated;
- optimizing a set of rule bit vectors in at least one original chunk to produce an optimized chunk, including changing selected set bits of the set of rule bit vectors, wherein vectors generated by cross-producting each of the original rule bit vectors and the optimized rule bit vectors of an original chunk with rule bit vectors for a chunk or chunks in an associated group will have the same highest priority bit set; and
- for each optimized chunik, cross-producting the optimized rule bit vectors with original or optimized rule bit vectors in the chunk or chunks of the optimized chunk's associated group to produce a cross-producted chunk.

16. The computer-readable medium of claim 15, wherein execution of the instructions perform further operations comprising:
- reading grouping information associating the original and to be generated chunks into associated groups;
- cross-producting the optimized rule bit vectors by group to produce a first set of cross-producted chunks; and
- repeating the rule bit optimizing and cross-producting operations on the first and any subsequent set of cross-producted chunks produced in a recursive manner until a single final chunk is produced.

17. The computer-readable medium of claim 15, wherein execution of the instructions perform further operations comprising:
- associating each unique optimized rule bit vector in a chunk with a corresponding identifier (ID) value;
- storing the ID values for each chunk in an array; and
- indexing the arrays in a manner that enables an ID value for a given chunk to be retrieved based on a concatenation of ID values in upstream chunks from which the given chunk was generated.

18. The computer-readable medium of claim 15, wherein execution of the instructions perform further operations comprising:
- optimizing the rule bit vectors in first and second chunks to produce a final chunk, the first chunk comprising a prefix pair chunk including entries derived from rules corresponding to source and destination addresses, and the second chunk comprising a ports-protocol chunk including entries derived from rules corresponding to source port, destination port, and protocol values.

* * * * *

UNITED STATES PATENT AND TRADEMARK OFFICE
CERTIFICATE OF CORRECTION

PATENT NO. : 7,668,160 B2  Page 1 of 1
APPLICATION NO. : 11/097628
DATED : February 23, 2010
INVENTOR(S) : Narayan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 974 days.

Signed and Sealed this

Twenty-eighth Day of December, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,668,160 B2 | |
| APPLICATION NO. | : 11/097628 | |
| DATED | : February 23, 2010 | |
| INVENTOR(S) | : Narayan et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 974 days.

In column 20, at line 55 delete, "farther" and insert --further--.

In column 21, at line 21 delete, "chunik" and insert --chunk--.

Signed and Sealed this
Twenty-fifth Day of January, 2011

David J. Kappos
*Director of the United States Patent and Trademark Office*